US012559977B2

(12) United States Patent
Barros et al.

(10) Patent No.: US 12,559,977 B2
(45) Date of Patent: Feb. 24, 2026

(54) LOCKING MODULE FOR A CONTAINER

(71) Applicant: Igloo Products Corp., Katy, TX (US)

(72) Inventors: Roque Barros, Katy, TX (US); Doug Hardesty, Katy, TX (US); James McKenrick, Katy, TX (US); John P. Cichello, Wooster, OH (US)

(73) Assignee: Igloo Products Corp., Katy, TX (US)

( * ) Notice: Subject to any disclaimer, the term of this patent is extended or adjusted under 35 U.S.C. 154(b) by 438 days.

(21) Appl. No.: 17/874,701

(22) Filed: Jul. 27, 2022

(65) Prior Publication Data

US 2023/0032389 A1 Feb. 2, 2023

Related U.S. Application Data

(60) Provisional application No. 63/227,217, filed on Jul. 29, 2021.

(51) Int. Cl.
*E05B 47/00* (2006.01)
*B65D 55/02* (2006.01)
*E05B 65/52* (2006.01)

(52) U.S. Cl.
CPC ........ *E05B 47/0011* (2013.01); *B65D 55/028* (2013.01); *E05B 47/0047* (2013.01);
(Continued)

(58) Field of Classification Search
CPC ............. E05B 47/0047; E05B 47/0011; E05B 47/023; E05B 47/026; E05B 47/0046; E05B 47/0012; E05B 2047/0024; E05B 2047/0016; E05B 2047/0017; E05B 65/52; E05B 65/5246; E05B 65/5269; E05B 65/5276; E05B 65/0053; E05B 63/246; E05B 83/26; B65D 55/028; A47G 2029/147; A47G 29/141; Y10T 292/1082; Y10T 292/699; Y10T 292/702; Y10S 292/11; Y10S 292/42
(Continued)

(56) References Cited

U.S. PATENT DOCUMENTS 1,636,809 A * 7/1927 De Groot ................ E05B 65/52 70/70
1,941,150 A * 12/1933 Meyer ...................... E05B 65/52 70/393
(Continued)

FOREIGN PATENT DOCUMENTS

AU 202112382 7/2021
AU 202112383 7/2021
(Continued)

OTHER PUBLICATIONS

U.S. Appl. No. 63/227,217 titled "Delivery Module for a Cooler", filed Jul. 29, 2021.
(Continued)

*Primary Examiner* — Steven A Tullia
(74) *Attorney, Agent, or Firm* — Dinsmore & Shohl LLP

(57) ABSTRACT

The present disclosure relates generally to accessories for containers. More specifically, but without limitation, the present disclosure relates to a locking module for a container, for example insulated container, which allows access to store goods, such as delivered goods, but alternately denies access to those who are not intended to have access.

17 Claims, 20 Drawing Sheets

(52) U.S. Cl.
CPC ................. *E05B 2047/0016* (2013.01); *E05B 2047/0024* (2013.01); *E05B 65/52* (2013.01)

(58) Field of Classification Search
USPC ......................................................... 70/178.1
See application file for complete search history.

(56) References Cited

U.S. PATENT DOCUMENTS

| | | | | | |
|---|---|---|---|---|---|
| 3,605,431 | A * | 9/1971 | Carson | F25D 23/069 | 62/190 |
| 3,713,681 | A * | 1/1973 | Worley | E05C 19/024 | 292/341.17 |
| 4,368,819 | A * | 1/1983 | Durham | B65D 81/3823 | 206/544 |
| 5,024,471 | A * | 6/1991 | Kahl | E05B 65/0053 | 292/113 |
| 5,445,326 | A * | 8/1995 | Ferro | E05B 83/26 | 292/DIG. 43 |
| 5,493,099 | A * | 2/1996 | McWilliams, III | E05C 3/30 | 292/124 |
| 6,595,016 | B1 * | 7/2003 | Demirkiran | F25D 11/00 | 62/3.62 |
| 6,997,007 | B1 * | 2/2006 | Wyatt | F25D 27/00 | 62/264 |
| 7,357,271 | B2 * | 4/2008 | Hase | B65D 81/3818 | 220/592.2 |
| 7,653,603 | B1 | 1/2010 | Holtkamp, Jr. | | |
| 8,539,790 | B1 * | 9/2013 | Budd | A01N 1/144 | 62/457.9 |
| 8,910,819 | B2 * | 12/2014 | Seiders | E05B 65/52 | 220/592.2 |
| 9,327,887 | B2 | 5/2016 | Farentinos | | |
| 9,418,495 | B2 | 8/2016 | Mackin | | |
| 9,593,513 | B2 * | 3/2017 | Higgins | E05B 83/26 | |
| 9,809,357 | B2 * | 11/2017 | Arnold | B65D 43/265 | |
| 9,850,687 | B2 * | 12/2017 | Roatis | E05B 65/462 | |
| 10,039,401 | B1 | 8/2018 | Romanucci | | |
| 10,131,478 | B2 | 11/2018 | Maser | | |
| 10,264,906 | B2 | 4/2019 | Bloom | | |
| 10,292,519 | B1 | 5/2019 | Sutton | | |
| 10,362,889 | B2 | 7/2019 | Debner | | |
| 10,638,848 | B1 | 5/2020 | Wesley | | |
| 10,653,262 | B1 | 5/2020 | Isreal | | |
| 10,766,672 | B2 * | 9/2020 | Bullock | B65D 51/1694 | |
| 10,769,875 | B2 | 9/2020 | Arellano | | |
| 10,772,450 | B2 | 9/2020 | Waisanen | | |
| 10,827,868 | B1 | 11/2020 | Wheaton | | |
| 10,835,046 | B2 | 11/2020 | Chasnis | | |
| 11,104,484 | B2 * | 8/2021 | Slattery | B65D 25/20 | |
| 11,160,409 | B2 * | 11/2021 | Bowman | A47G 29/30 | |
| 11,203,473 | B1 * | 12/2021 | McGowan | F25D 23/025 | |
| 11,253,096 | B2 * | 2/2022 | Bartley-Clark | A47G 29/30 | |
| 11,257,311 | B1 * | 2/2022 | Carpenter | B65D 77/06 | |
| 11,324,350 | B1 * | 5/2022 | Boggs | B65D 81/24 | |
| 11,369,222 | B2 * | 6/2022 | Kennett | E05B 47/00 | |
| 11,506,445 | B2 * | 11/2022 | Lubben | F25D 23/12 | |
| 11,583,123 | B2 * | 2/2023 | Rodgers | A47G 29/141 | |
| 11,661,769 | B2 * | 5/2023 | Miwa | E05B 83/26 | 292/336.3 |
| 11,846,118 | B2 * | 12/2023 | Williams | A47J 41/0083 | |
| 2003/0014835 | A1 * | 1/2003 | Dimig | E05B 85/16 | 16/110.1 |
| 2005/0178135 | A1 * | 8/2005 | Schanin | G07F 11/04 | 700/295 |
| 2007/0125100 | A1 | 6/2007 | Shoenfeld | | |
| 2007/0227913 | A1 | 10/2007 | Shoenfeld | | |
| 2008/0105012 | A1 * | 5/2008 | Poppell | E05B 85/18 | 70/279.1 |
| 2008/0142522 | A1 * | 6/2008 | Maid | E05B 47/023 | 70/159 |
| 2008/0150676 | A1 * | 6/2008 | Ennis | E05B 65/52 | 70/57.1 |
| 2014/0202220 | A1 | 7/2014 | Denison et al. | | |
| 2015/0000571 | A1 * | 1/2015 | Stemen | E05G 1/005 | 109/23 |
| 2015/0035288 | A1 * | 2/2015 | Fink | B65F 1/1615 | 292/2 |
| 2015/0345853 | A1 * | 12/2015 | Oeyen | B65D 81/3823 | 62/457.2 |
| 2016/0057968 | A1 * | 3/2016 | Chandler | A01K 1/0245 | 119/497 |
| 2016/0251124 | A1 * | 9/2016 | Arnold | B65D 43/22 | 220/324 |
| 2017/0215643 | A1 * | 8/2017 | Beach | A47J 47/14 | |
| 2017/0350172 | A1 * | 12/2017 | Tamura | E05B 79/22 | |
| 2019/0167025 | A1 | 6/2019 | Cherry | | |
| 2019/0239673 | A1 | 8/2019 | Silva | | |
| 2019/0266819 | A1 | 8/2019 | McHale | | |
| 2019/0313826 | A1 | 10/2019 | Bickford | | |
| 2019/0387910 | A1 | 12/2019 | Stoich | | |
| 2020/0077826 | A1 | 3/2020 | Chenier | | |
| 2020/0080355 | A1 * | 3/2020 | Tung | E05C 1/006 | |
| 2020/0128991 | A1 | 4/2020 | Jessie | | |
| 2020/0138225 | A1 | 5/2020 | Martin | | |
| 2020/0237946 | A1 | 7/2020 | Shell | | |
| 2020/0281386 | A1 | 9/2020 | Knox | | |
| 2020/0281387 | A1 | 9/2020 | Poss | | |
| 2020/0323376 | A1 | 10/2020 | Waisanen | | |
| 2020/0359819 | A1 | 11/2020 | Roberts | | |
| 2021/0251409 | A1 * | 8/2021 | Kennett | A47G 29/141 | |
| 2022/0114847 | A1 | 4/2022 | Emde | | |
| 2022/0114853 | A1 | 4/2022 | Emde | | |
| 2022/0228406 | A1 | 7/2022 | Barros | | |
| 2023/0084441 | A1 * | 3/2023 | Lubben | F25D 23/10 | 62/440 |
| 2023/0213264 | A1 * | 7/2023 | Jacob | B65D 81/3825 | 62/457.1 |

FOREIGN PATENT DOCUMENTS

| | | | | | |
|---|---|---|---|---|---|
| AU | 202112384 | | | 7/2021 | |
| AU | 202112385 | | | 7/2021 | |
| AU | 202112386 | | | 7/2021 | |
| AU | 202112387 | | | 7/2021 | |
| AU | 202113320 | | | 8/2021 | |
| AU | 202113321 | | | 8/2021 | |
| AU | 202113322 | | | 8/2021 | |
| AU | 202113323 | | | 8/2021 | |
| AU | 202113324 | | | 8/2021 | |
| AU | 202113325 | | | 8/2021 | |
| CN | 307366414 | S | | 5/2022 | |
| CN | 307400399 | S | | 6/2022 | |
| CN | 307433950 | S | | 7/2022 | |
| DE | 3524641 | A1 | * | 1/1987 | E05C 9/041 |
| DE | 202009010299 | | | 1/2011 | |
| EA | 004886000-0002 | | | 3/2018 | |
| EP | 2279967 | | | 2/2011 | |
| EP | 4014823 | | | 6/2022 | |
| GB | 191225209 | A | * | 10/1913 | E05B 65/52 |
| GB | 2538958 | A | * | 12/2016 | A45C 11/20 |
| GB | 9004886000-0001 | | | 3/2018 | |
| GB | 9004886000-0002 | | | 3/2018 | |
| GB | 2588164 | A | | 4/2021 | |
| JP | 2021077733 | A | * | 5/2021 | E05C 19/022 |
| NO | 20201096 | A | | 4/2021 | |
| WO | 0036947 | A1 | | 6/2000 | |
| WO | 2005008000 | A2 | | 1/2005 | |
| WO | 2014182636 | A1 | | 11/2014 | |
| WO | WO-2015150753 | A1 | * | 10/2015 | A47G 29/141 |
| WO | 2022081206 | | | 4/2022 | |
| WO | 2022081207 | | | 4/2022 | |
| WO | 2022136420 | A1 | | 6/2022 | |

OTHER PUBLICATIONS

International Search Report and Written Opinion issued in PCT Application No. PCT/US2022/038492 mailed on Oct. 19, 2022.
International Preliminary report on Patentability issued in PCT Application No. PCT/US2022/038492 mailed on Feb. 8, 2024.

(56) References Cited

OTHER PUBLICATIONS

The Deliverysafe; Lockable insulated delivery box, large; published date: Oct. 20, 2020 [retrieved on Aug. 18, 2022 from Internet Wayback Machine].
Yale; Smart Delivery Box; published date: Oct. 4, 2020 [retrieved on Aug. 18, 2022 from Internet Wayback Machine].
Eufy Security; Kickstarter-Secure Deliveries Made Easy with SmartDrop; published date: Mar. 24, 2022 [retrieved on Aug. 18, 2022 from Internet Wayback Machine].
Benchsentry; Anti-Theft Bench that works with your smart home; published Aug. 5, 2020 [retrieved on Aug. 18, 2022 from Internet Wayback Machine].
Dynosafe; Own The Porch; published date: Feb. 11, 2021 [retrieved on Aug. 18, 2022 from Internet Wayback Machine].
Homevalet; Don't wait for deliveries, let them wait for you. published date: Dec. 17, 2021 [retrieved on Aug. 18, 2022 from Internet Wayback Machine].
The Deliverysafe; Noninsulated delivery box, medium; published date: Jun. 20, 2021 [retrieved on Aug. 18, 2022 from Internet Wayback Machine].
Design U.S. Appl. No. 29/783,065, filed May 11, 2021 titled Delivery Box.
Design U.S. Appl. No. 29/785,134, filed May 24, 2021 titled Delivery Box.
Design U.S. Appl. No. 29/837,304, filed May 4, 2022 titled Delivery Box.
U.S. Appl. No. 17/875,693, filed Jul. 28, 2022 titled Containment System Including a Soft Container.
PCT Application No. PCTUS2022038492 filed Jul. 27, 2022 titled Locking Module for a Container.
Design U.S. Appl. No. 29/787,872, filed Jun. 9, 2021 titled Picnic Basket Cooler.
Design U.S. Appl. No. 29/799,562, filed Jul. 15, 2021 titled Storage Container.
PCT Application No. PCT/US2022/026932 filed Apr. 29, 2022 titled Accessory Grid Apparatus for a Cooler.
Design U.S. Appl. No. 29/781,824, filed Apr. 30, 2021 titled Cooler Accessory Grid.

* cited by examiner

LOCKING MODULE FOR A CONTAINER

CLAIM TO PRIORITY

This non-provisional patent application claims priority to and benefit of, under 35 U.S.C. § 119(e), U.S. Provisional Patent Application Ser. No. 63/227,217, filed Jul. 29, 2021, titled "Delivery Module for a Cooler", all of which is incorporated by reference herein.

CROSS-REFERENCE

Cross-reference is made to the following applications, all of which are incorporated by reference herein: U.S. application Ser. No. 17/246,072 having filing date Apr. 30, 2021; U.S. application Ser. No. 17/246,132 having filing date Apr. 30, 2021; U.S. application Ser. No. 29/781,824 having filing date Apr. 30, 2021; U.S. application Ser. No. 29/799562 having filing date Jul. 15, 2021; and PCT Application Serial No. PCT/US2022/026932 having filing date Apr. 29, 2022.

TECHNICAL FIELD

The present disclosure relates generally to a container and a locking module which define a system. More specifically, but without limitation, the present disclosure relates to a locking module for a container, for example an insulated container, which allows for limited access to the place contents therein and retrieve the contents by only those permitted to do so.

BACKGROUND

For years, it has been problematic for delivery service providers to fulfill many types of direct to consumer orders. Online marketplaces and merchants exist that allow consumers to purchase goods or services (e.g., groceries, meals or meal services, frozen or fresh food, household goods, small electronics, pet products, pharmaceuticals, and healthcare items) that can be delivered by a delivery service provider directly to a location specified by the consumer. However, storage of the goods can be challenging if the consumer is not at the location when the delivery service provider arrives. This can lead to the items being left by the delivery service provider in unsuitable locations. Leaving frozen or fresh food in front of a consumer's door, for example, can result in spoilage.

Still further, insulated containers, for example coolers—both passive and active coolers—are widely used for camping, picnics, social activities and other events. It is always desirable to maximize the utility and capacity of the container. This utility includes limiting access solely to those who should have, or need, access. For example, delivery people may require access in order to drop off a food delivery, a prescription, or other deliverable. It would therefore be desirable to provide a system including a container and locking module which limits access to the contents of the container to only those who need it.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

Present embodiments are directed to various aspects of a locking module that is installed on a container, for example an insulated container. More particularly present embodiments relate to a locking module that is configured to be secured to an insulated container such as a delivery box or a cooler. The locking module and container define a system which allows, or limits, access to the container for example to receive and protect deliverables, while protect such from theft once delivered.

According to some embodiments, a system comprises an insulated container having a base and a lid, the base having an outer shell, an inner shell, and a cavity therebetween having an insulating portion disposed in the cavity, and at least one storage compartment. The lid has a lid outer shell, a lid inner shell and a lid cavity therebetween, and further comprises a lid insulating portion therebetween. An opening may be formed in the base, the opening defined in at least the outer shell of the base. A locking module is disposed in the opening, the locking module having a keypad and a lock assembly. An upper surface of the locking module being aligned with an upper periphery of the base to define a sealing surface for the lid.

In some aspects, the locking module may comprise a one or more piece housing.

In some aspects, the locking module may be fastened in the opening formed in the base.

In some aspects, the opening may be defined in both of the outer shell and the inner shell.

In some aspects, the lid may further comprise a latch which engages the locking module.

In some aspects, the latch may be formed integrally with, and depending from, the lid.

In some aspects, the latch may be formed separately of a metal or metal alloy and attached to the lid.

In some aspects, the lock assembly may comprise a locking pawl which is biased in one direction.

In some aspects, the system may further comprise the torsion spring to bias the locking pawl.

In some aspects, the locking assembly may further comprise an actuator to move the locking paw and disengage the latch.

In some aspects, the actuator may be a solenoid or a cam.

In some aspects, the locking assembly may comprise a rotatable motor and rotatable catch to engage and disengage the latch.

In some aspects, the rotatable catch may have a pin or a slot to engage a cooperating portion of the latch.

In some aspects, the system may further comprise a spring loaded catch which moves to allow passage and engages the latch to retain the lid in a closed position.

In some aspects, the system may further comprise a movable solenoid to allow movement of the spring loaded latch and disengagement of the latch, for opening of the lid.

In some aspects, the system may further comprise a safety release on the locking module.

In some aspects, the system may further comprise a handle connected to a cord to pull and release the lock assembly.

In some aspects, the system may further comprise a battery compartment for powering of the lock assembly.

In some aspects, the system may further comprise the battery compartment being a drop in compartment or disposed in a rear surface of the locking module.

In some aspects, the system may further comprise a key lock on the locking module.

In some aspects, the system may further comprise a camera module disposed on the locking module.

BRIEF DESCRIPTION OF THE DRAWINGS

The accompanying drawings illustrate only various embodiments of a smart box cooler or container and method and therefore are not to be considered limiting of the scope of this disclosure. The principles illustrated in the various embodiments of the drawings can be applied to alternate methods and apparatus. Additionally, the elements and features shown in the drawings are not necessarily to scale, emphasis instead being placed upon clearly illustrating the principles of the various embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

Figure 1:
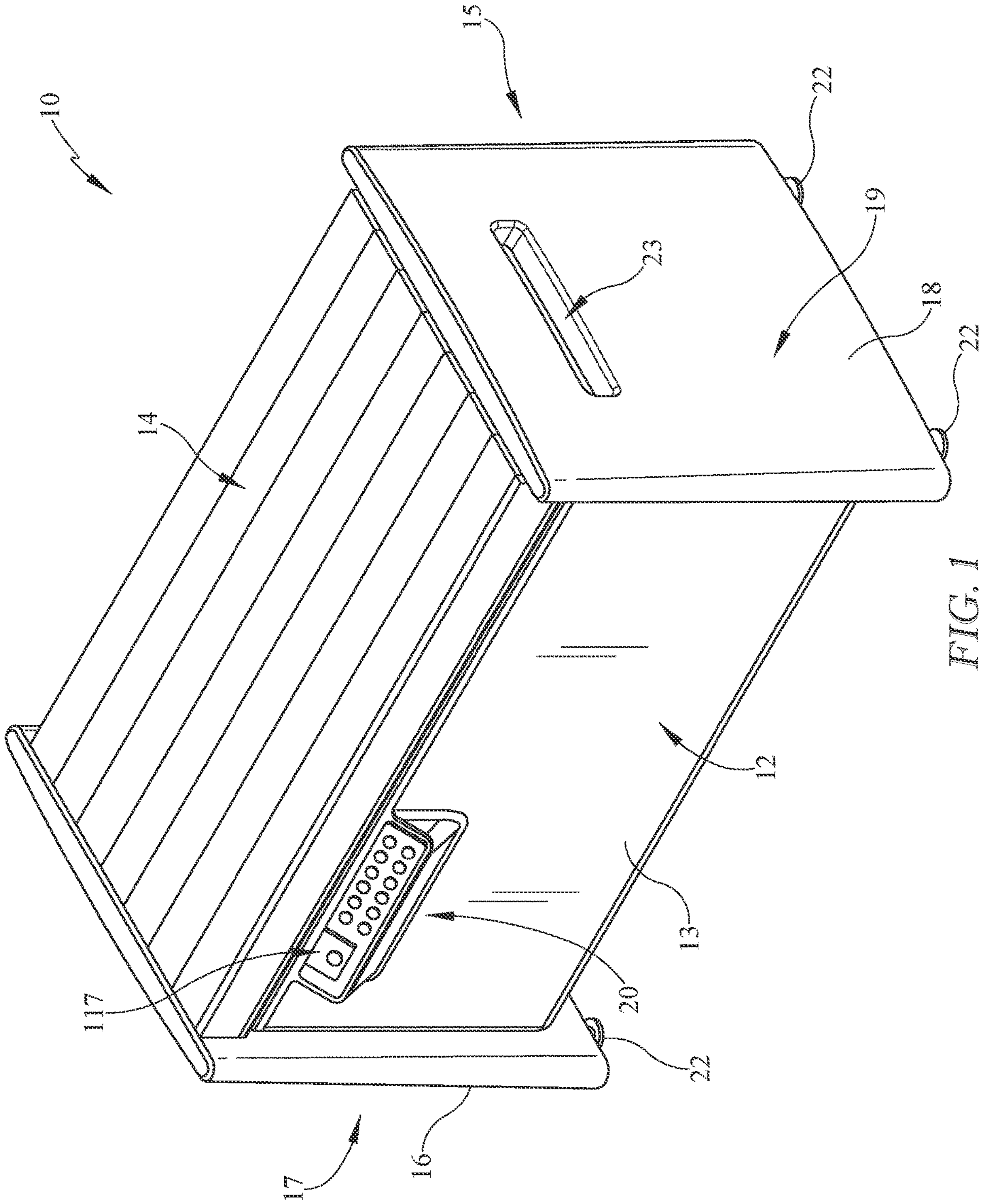
FIG. 1 is a perspective view of an example insulated container in accordance with some embodiments depicted in a closed configuration and having a locking module.

It is to be understood that a locking module for a container is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

The example embodiments described herein are directed to various aspects (e.g., methods, systems, devices) of a container, and more particularly to a container, such as a delivery box or a cooler, having a locking module to limit or preclude access to the interior of the container for only those intended. The accessory grid apparatus can be used to customize the insulated container cooler with one or more accessories.

Insulated containers may include a plurality of types for storage of deliverables including refrigerated or frozen items. Additionally pharmaceuticals may be delivered. In the event of delivered items, or in other situations where the container needs to be locked, a locking module is provided which allows for locking of the lid, so that only those intended to access are capable. The locking module may comprise a housing which contains a locking assembly that is actuated by one or more buttons on the exterior. The locking assembly in some embodiments may be electro-mechanical so that the locking assembly may be actuated between locked and unlocked positions. The module may comprise a keylock to unlock the lock assembly and an internal release to override the lock assembly if a child is trapped inside the container. Additionally, the lock module may comprise a camera for facial recognition or to record those accessing the container. In some embodiments, a siren or alarm may be disposed in the lock module to signal when in appropriate access is occurring or has occurred. In addition to these features it may be desirable to include a child release feature when no power is available to the container. Additionally, it may be desirable to provide either an auto-lock feature when a lid closes, or it may be desirable that the electromechanical or manual actuation is necessary to lock the container. Additionally, it may be desirable to provide a mechanical method of opening from the outside of the container.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", "face," and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

Many aspects of the present disclosure can be better understood with reference to the following drawings. The components in the drawings are not necessarily to scale, emphasis instead being placed upon clearly illustrating the principles of the present disclosure.

Additional details are provided in the following, which is hereby incorporated by reference in its entirety.

Referring now to FIG. 1, a perspective view of a container 10 is shown, also sometimes referred to as a cooler. In some embodiments, the container 10 may be a delivery box, for depositing of delivered goods of various types. The container 10 may be insulated or non-insulated. As discussed primarily herein, the container 10 is mostly described as an insulated container however such description is not limiting of the use of a lock module 20. The lock module 20 may be used various types of containers including coolers as shown in some embodiments.

The perspective view of the device comprises an insulated container 10 having a base 12 and a lid 14. The base 12 defines a storage compartment wherein products may be deposited. The base is shown with a three-dimensional rectangular shape having two parallel long sides 13, 15 (front and rear) and two parallel shorts sides 17, 19. The insulated container 10 may be of various other shapes as well.

The lid 14 is shown in a closed position in the depicted embodiment. The lid 14 of the depicted embodiment may be pivotally or hingedly connected to the rear upper edge of the base 12. The lid 14 can pivot between the position shown in FIG. 1 and an open position shown in FIG. 3. While the lid 14 is pivotally connected in some embodiments, but may be connected in other movable manners, such as slidably, or removably, so that the contents of the base 12 may be retrieved. Further, in the depicted embodiment, the lid 14 is pivoted along the rear side 15, one of the longer sides. However, in some other embodiments, the lid 14 may be pivoted along one of the short sides 17, 19 or alternatively in other locations.

The instant embodiment may further comprise a locking module 20 which allows access or secures the lid 14 in a closed position precluded unintended opening or access to the container 10. The locking module 20 is generally represented by a plurality of buttons 131 which may be used in designated combination to lock or unlock the insulated container 10. The locking module 20 may further comprise a key lock or other mechanical entry alternatively, or additionally. The locking module 20 may be powered by battery power, or a plug-in electrical system, solar power, or any combination. The locking module 20 may in some embodiments comprise an electrically operated actuator to control access to interior of the insulated container 10. In some examples the actuator may be a solenoid, a linear actuator, a rotational actuator, a motor, or other embodiments. Activating the electrically operated actuator, can, in some examples, include causing the electrically operated actuator to be energized or deenergized which causes a movement. Some aspects of the disclosure provide that activating the electrically operated actuator prevents the locking module 20 of the container 10 from being unlocked. In some embodiments, the locking module 20 may further provide input devices such as a mouse, a keyboard, a touch pad, a touch screen, a scanner, or a microphone. Additionally, the locking module 20 may also provide at least one output device 117 for example a display, a siren, a speaker, a status indicator, camera module, or other suitable output device. Further, while the locking module 20 is generally described as being located in the base 12 of the container, it should be understood that the lock module may also be disposed in the lid 14.

The insulated container 10 is also shown with end walls 16, 18 which may be formed integrally with the base 12 or may be formed separately and attached, for example by fastener or adhesive. The end walls 16, 18 may include support feet 22 for leveling adjustment and/or permanent connection of the container 10 to a substrate, such as a front porch or other area of delivery. The end walls 16, 18 may also include handholds 23 in which the insulated container 10 may be grasped and lifted or moved if needed. The end walls 16, 18 and the container as whole may, in some non-limiting embodiments, have the appearance of furniture piece as may be desirable for outdoor, porch positioning.

Figure 2:
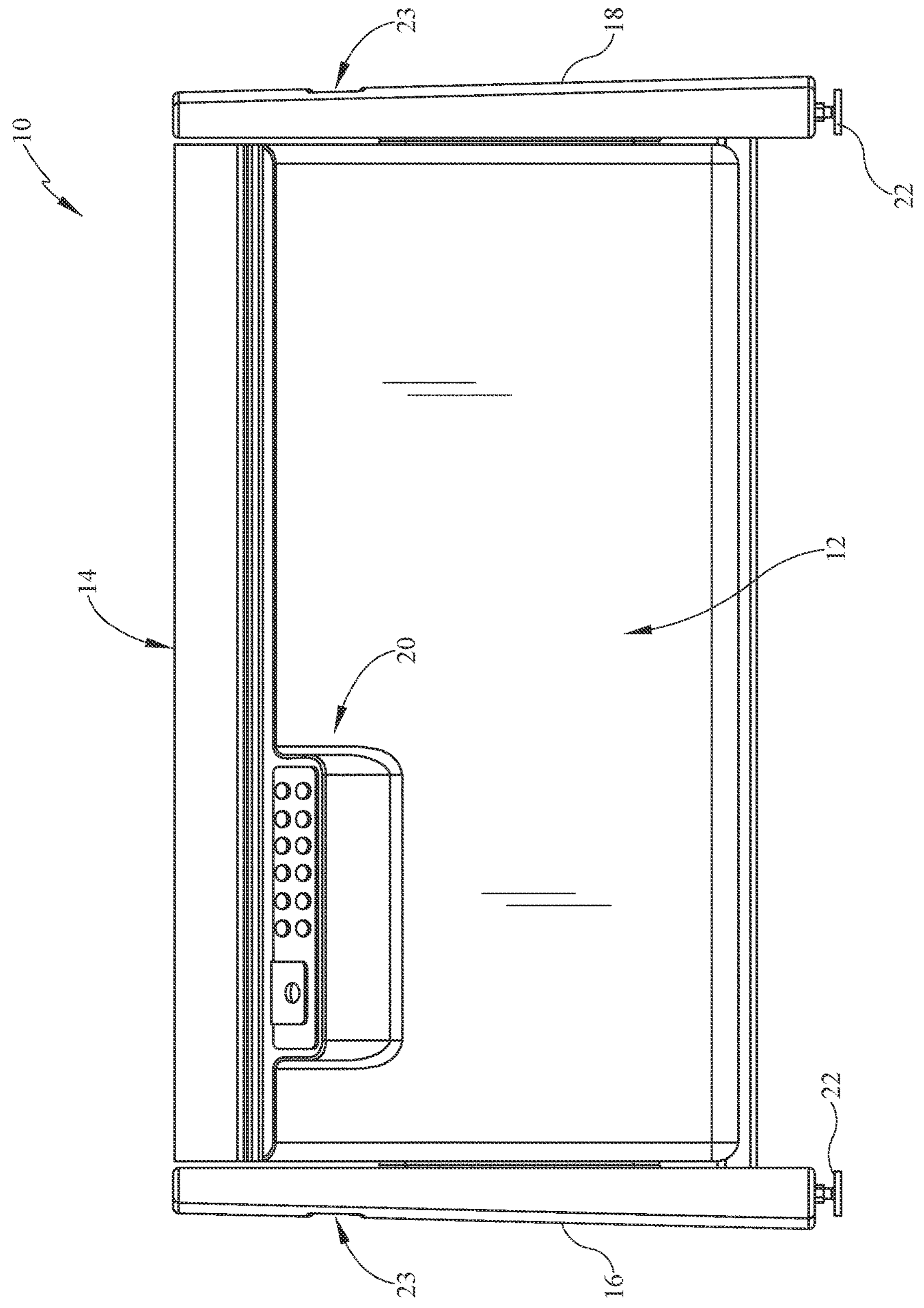
FIG. 2 is a front view of an example insulated container in accordance with some embodiments with a locking module.

Referring now to FIG. 2, a front view of the insulated container is shown. The view is depicted to show feet 22 depending from the insulated container 10. The feet 22, according to some nonlimiting embodiments, may be adjustable for leveling for example. In the instant embodiment, the adjustable feet 22 are disposed on the end walls 16, 18, but in other embodiments, may be disposed on the base 12 of the insulated container 10. Thus the end walls 16, 18 provide a location for lifting and moving via the handholds 23, and also provide a location for positioning of the adjustable feet 22 for adjustment. In some examples, the feet 22 may comprise a threaded rod which is threaded into a threaded anchor in the end walls 16, 18. The threaded rod may also include a nut which may be tightened against the end wall 16, 18 so that the feet 22 are locked in position.

Figure 3:
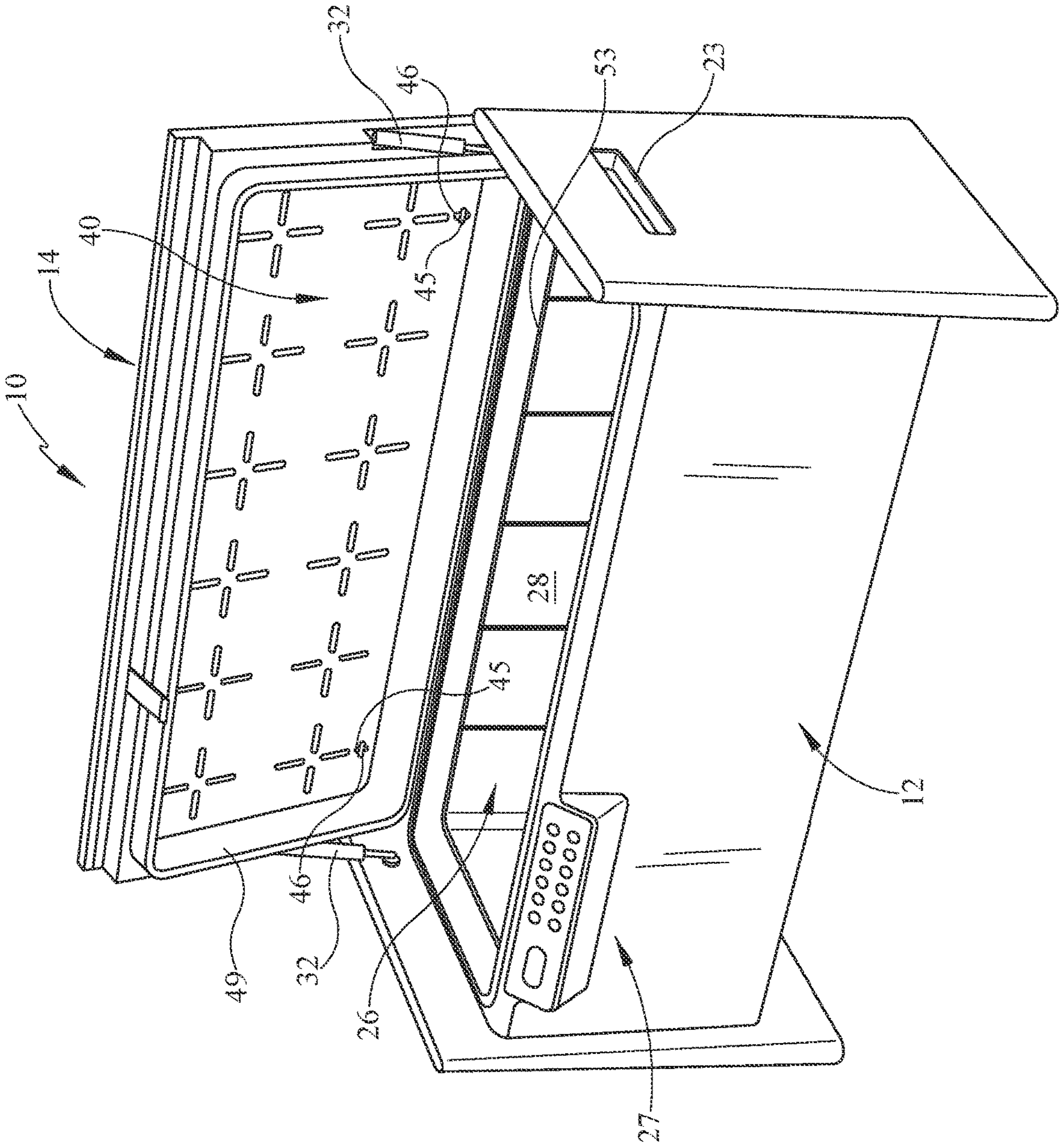
FIG. 3 is a perspective view of an example insulated container in accordance with some embodiments depicted in an open configuration and showing an example accessory grid.

Referring now to FIG. 3, a perspective view of the insulated container 10 is shown in with the lid 14 in an open position. An interior storage compartment 26 is shown within the base 12. The interior storage compartment 26 may be used to store various items or goods, including but not limited to, grocery delivery, prepared meal delivery, takeout home delivery, frozen/fresh food shipments, non-grocery product deliveries such as household goods, small electronics, pet products, pharmaceuticals, healthcare items, and more.

Within the interior storage compartment 26 there may be a single volume or a divided volume to separate goods. For example, at least one thermal storage divider (not shown) can be positioned in the storage compartment 26. The interior divider may provide for compartmentalization of cold/frozen foods and maintaining a food safe temperature. Additionally, a support ledge 53 may be provided within the base 12 to support a wire basket or other accessory that suspend at least one gel pack, ice block, or other thermal storage member. Still further, the accessory grid 40 may be formed to pivot, for example from the hinge between the lid 14 and base 12, or a separate hinge, and may be supported on such ledge 53 (FIG. 3).

Further, with the lid 14 shown in the open position, the lid 14 is shown having a depth wherein an accessory storage grid 40 may be positioned and wherein accessories may be located. The inside of the lid 14 and the accessory grid 40 may define a lid storage compartment wherein one or more accessories may be positioned and retained. Depending on the size and weight of the lid 14, the container 10 may comprise lift assisting actuators 32 disposed between the base 12 and lid 14. The actuators 32 may be pneumatic, hydraulic, spring biased, or other mechanical or electrical forms. The accessory grid 40 may be formed of various metals or plastics and in some embodiments may be formed of polyethylene, although various other materials may be used.

Also visible from this view is an inner shell or liner 28. The base 12 may be formed of an outer shell 27, and the inner shell 28. In some embodiments, where the container 10 may be insulated, an insulating material (not shown) may be disposed between the outer shell 27 and the inner shell 28. In such configuration, and according to some embodiments, a cavity (not shown) may be disposed between the outer shell 27 and the inner shell 28. Within the cavity between the outer shell 27 and the inner shell 28, an additional insulating material may be disposed, for example. In some embodiments, the outer shell 27 may be formed of polyethylene, for non-limiting example. In some embodiments, the inner shell 28 may be formed of polypropylene for non-limiting example. Further, the insulating material within the cavity may be for example a polyurethane foam in some non-limiting examples.

Likewise, the lid 14 may have a similar construction. The lid 14 may be formed of a lid outer shell, a lid inner shell, and an optional insulation between the inner and outer shells. The construction of the container 10 may be dependent on whether or not insulating features are necessary or the level of importance of such insulating features.

Further shown in this configuration with the lid open, the inner area of the lid 14 is shown with the accessory storage grid 40 therein. The storage grid 40 may be connected by attachment elements for either a permanent or releasable connection. The accessory storage grid 40 is disposed for within the insulated container 10 in various manners. For example, the accessory grid 40 may be fixed within the lid 14, for example by forming integrally when the lid 14 or a lid inner shell is formed. Alternately, the holes 46 in the accessory grid 40 may be connected to the lid 14 by a plurality of fasteners.

Further, the accessory grid 40 may be releasably connected to the lid 14 by attachment elements. As depicted for example, the storage grid 40 may include holes 46 for rotatable lock knobs 45 that pass through the holes 46 and lock the accessory grid 40 in position, within the lid 14 by rotating the knobs 45. The lock knobs 45 can rotate from a first or unlocked position to a second or locked position (shown). In some examples, the lock knobs 45 can be manually turned to retain the accessory grid 40 in position. Alternately, the lid 14 may have holes and the accessory grid 40 may include the engagement tab or other feature to connect to the undersurface of the lid 14. Alternately, the attachment elements of the lid 14 may be fixed structures that pass through holes in the accessory grid 40 and retain the grid 40 in position.

Still further, in other embodiments, the accessory grid 40 may be pivotally connected by hinge for example, the base 12, so that the accessory grid 40 may be pivoted down over the storage compartment 26 or may be pivoted up into the lid 14. For example, in such embodiment, the accessory grid 40 may be supported about the peripheral edge by an internal ledge 53 within the base 12.

Also shown in FIG. 3, the inside of the lid 14 may include a wall or drape 49 which is extending from the lid 14 interior surface and around the accessory grid 40. The wall or drape 49 provides a depth wherein the accessories may be located on the lid 14. The wall or drape 49 may extend into the base 12 when the lid 14 is closed. The lid inner surface and the drape 49 may define a lid storage area or compartment. The drape 49 may or may not include an internal insulation.

The lid 14 may also have an insulation layer (not shown) for thermal efficiency and a lid gasket for thermal efficiency and weatherproofing. Alternatively, the base 12 may include a gasket and engage with a rib or other structure, such as the drape 49, within the base 12.

Figure 4:
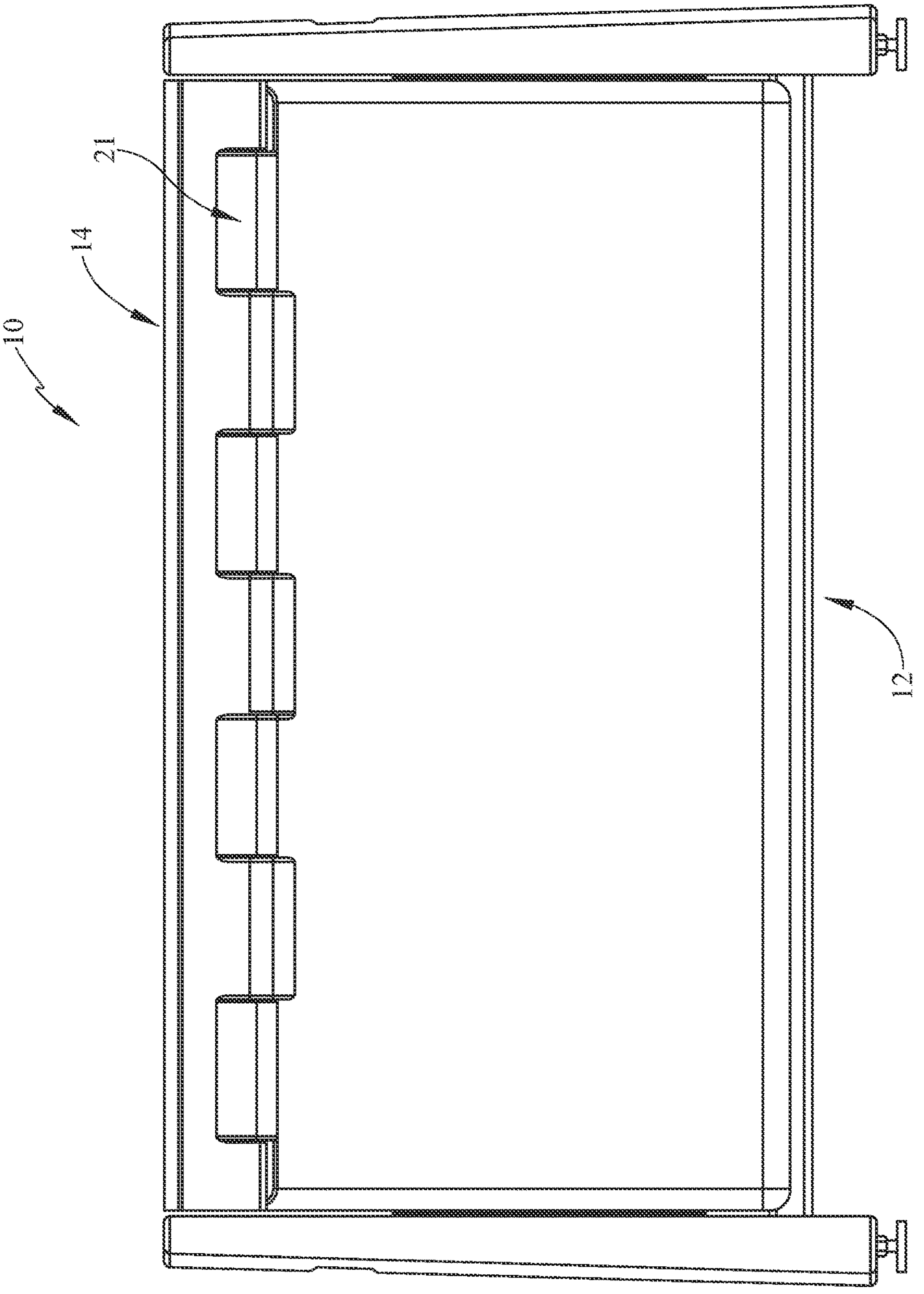
FIG. 4 is a rear view of an example insulated container in the closed configuration in accordance with some embodiments.

Referring now to FIG. 4, a rear view of the insulated container 10 is shown. The rear view depicts an area where the lid and the base connect by hinge or hinged connection 21. The hinged connection 21 comprises a hinge axis which is horizontal in the depicted orientation. The hinged connection 21 is disposed along the rear upper edge of the base, so that the lid opens, as shown in FIG. 3, relative to the rear edge of the insulated container 10.

Figure 5:
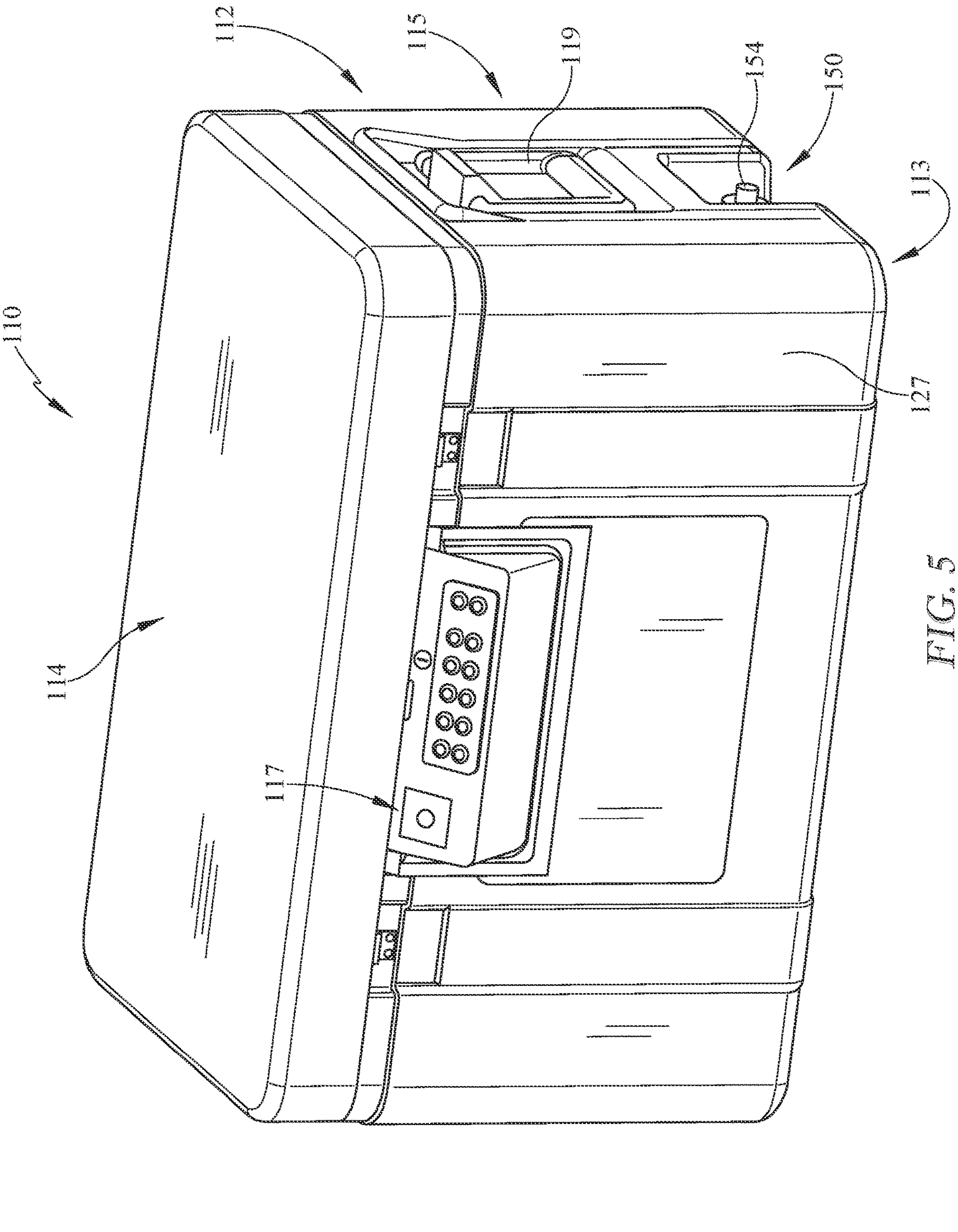
FIG. 5 is a perspective view of a second example insulated container depicted in a closed configuration and having a locking module.

Referring now to FIG. 5, an further embodiment of a container 110 is depicted. In this embodiment, the container 110 may also be insulated or non-insulated, as with the previous. The container 110 comprises a base 112 and a lid 114. Each of the base 112 and the lid 114 may comprise an outer shell 127, an inner shell 128 and a cavity between which may, or may not, be filled with an insulation, adhesive, insulative foam, or some combination. The embodiment of FIG. 5 has an appearance which is more similar to a cooler type of container with a hinged lid arrangement. It should be understood that the containers 10, 110 or other containers may all comprise the embodiments depicted, or combinations of various of the embodiments described herein.

Figure 6:
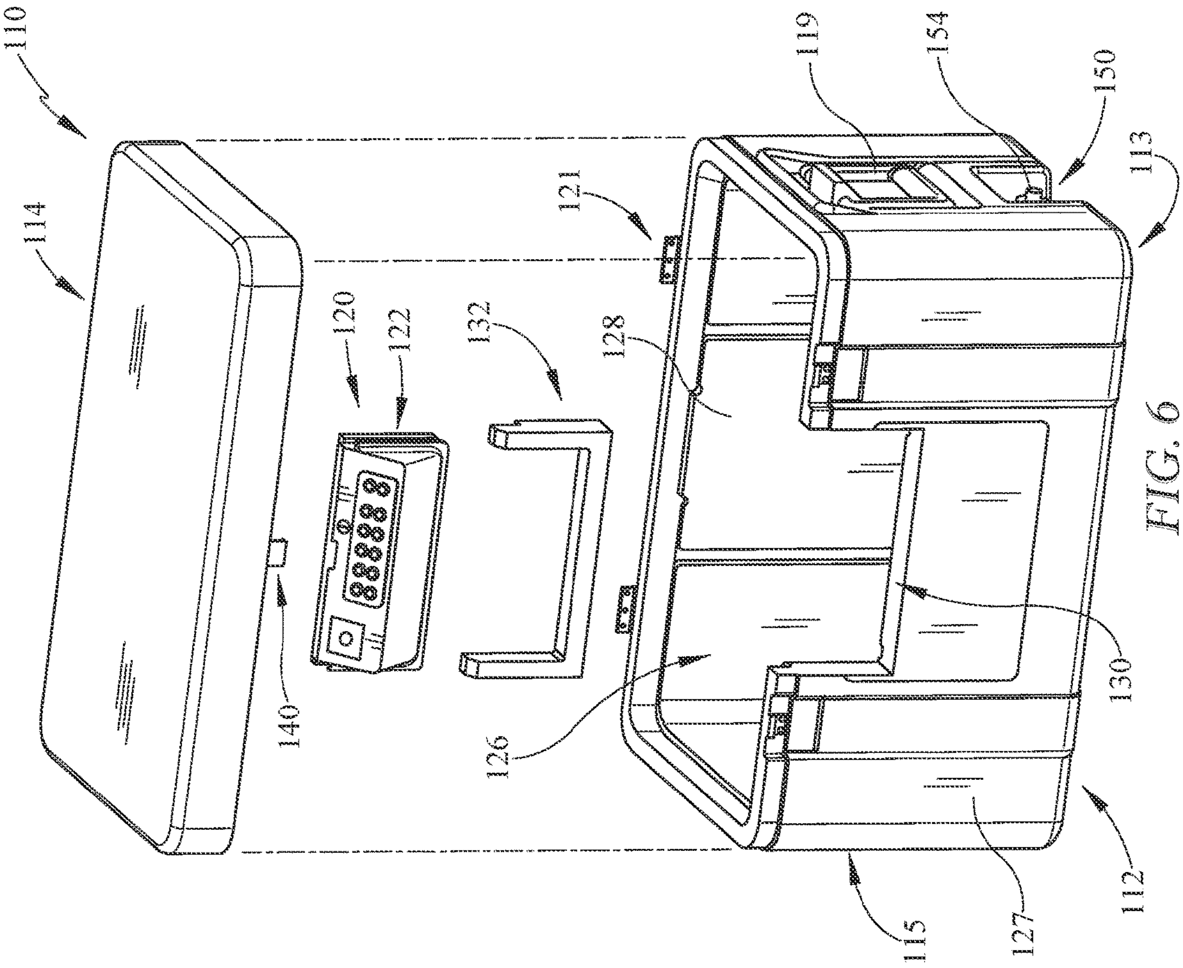
FIG. 6 is an exploded perspective view of the insulated container of FIG. 5.

With additional reference to FIG. 6, an exploded view of the container 110 is provided. The base 112 comprises a bottom 113 and one or more sidewalls 115 extending upwardly from the bottom. The one or more sidewalls 115 are shown extending from the peripheral edge of the bottom 113. Within the base 112, a basin or internal storage compartment 126 is defined wherein food, drinks, or any other deliverables may be stored, so that the goods may be stored upon delivery.

In some embodiments, the base 112 comprises a front wall, a rear wall, and two end or side walls extending between the front and rear walls, all collectively sidewalls 115. The dimensions of the front/rear and end walls 115 may vary and in some embodiments may be formed to define a rectangular, square shape, or other geometry. A rear hinge 121 is shown extending from the base and connects to the lid 114. The lid 114 may be pivotally opened in order to access the internal basin 126 of the base 112.

Also shown in this embodiment are handles 119 disposed on the end or side wall of the base. The handles 119 may take various forms which allow for carrying of the container 110. The handles 119 may be pivotally connected and pivot outwardly for carrying or alternatively, rope or cable type handles may be used. Either of these types of handles may include a grip portion to aid in carrying the device.

At the front of the base 112, a portion of the front wall 115 is shown removed defining an opening 130. The opening 130 forms a location where the locking module 120 may be disposed. The opening may be formed in the outer shell 127 or both the outer shell 127 and the inner shell 128, as shown. In some embodiments, a module frame 132 may be positioned in the opening 130 and form a seat for receiving the locking module 120. The module frame 132 is, in some examples, a U-shaped structure which receives the locking module 120 along the inner periphery, but engages the base 112 on the outer periphery. The module frame 132 may also function as a seal, or may additionally comprise a seat for a seal material along inner and outer peripheries of the module frame 132.

The opening 130 is formed centrally in the base 112 but in other embodiments may be located in other locations. The opening 130 and locking module 120 may also be positioned adjacent the front of the lid 114 so that when unlocked, the lid 114 may be opened in a nearby or adjacent location to the locking module 120. Accordingly, whereas the axis of the one or more hinges may be along the long wall or may be along the short wall of the one or more sidewall 115, the locking module 120 may be, in some embodiments, be positioned opposite the hinge 121 side of the container 10, 110.

Also shown near the bottom of the base and beneath one of the handles 119, may be a drain 150. The drain 150 may be defined by a drain hole 152 that passes through the outer shell 127, the inner shell 128, and the optional insulation therebetween. Additionally, the drain 150 may comprise a plug or a cap 154 to retain fluids from passing through the drain hole 152. The drain 150 may be desirable where the container is used with ice in order to keep contents cool. The drain 150 will allow the melted ice to exit from the container 110 when it melts.

As described with the container 10, the container 110 may be formed of an outer shell 127, an inner shell 128, and optionally insulation (not shown) between the two. In some embodiments the outer shell 127 may be formed of various materials including but not limited to polypropylene, polyethylene, or other materials or finishes, for example a stainless steel, aluminum, or other. Further, the inner shell 128 may be formed of various materials including, but not limited to, polypropylene, polyethylene, or others. Still further, the insulation may be, for non-limiting example, an adhesive foam, which not only insulates but also functions as an adhesive, such as a polyurethane foam. Additionally, in some embodiments, vacuum insulated panels may be used in combination with the insulation to provide improved reduction of heat transfer.

The outer shell 127 and the inner shell 128 may each be singular pieces, or each may be formed of multiple pieces, or a combination. For example, the inner shell 128 may be formed of a single structure in order to limit leakage where ice or liquid may be located. Alternately, the outer shell 127 may be a single structure or may be formed of multiple pieces that are connected by pins, fasteners, adhesives, and the like. The inner shell 128 and the outer shell 127 may be blow molded, injection molded, vacuum molded, or other forms of manufacture.

The system may also comprise a lock assembly 134 (FIG. 10) within the locking module 120 that cooperates with a latch 140 (FIG. 8) formed on, or connected to, the lid. The latch 140 may be formed of the same material as other parts of the lid if integrally formed for example, or may be formed of a metal or metal alloy and fastened to the lid in various positions. The locking module 120 may be a powered locking mechanism with a non-powered override. The locking module 120 has various characteristics which are desirable in a container. For example, the locking module 120 provides for ease of installation, it allows for or otherwise does not preclude, sealing, allows for battery replacement, provides for emergency release of the lock assembly, and provides strength and security for the container.

Figure 7:
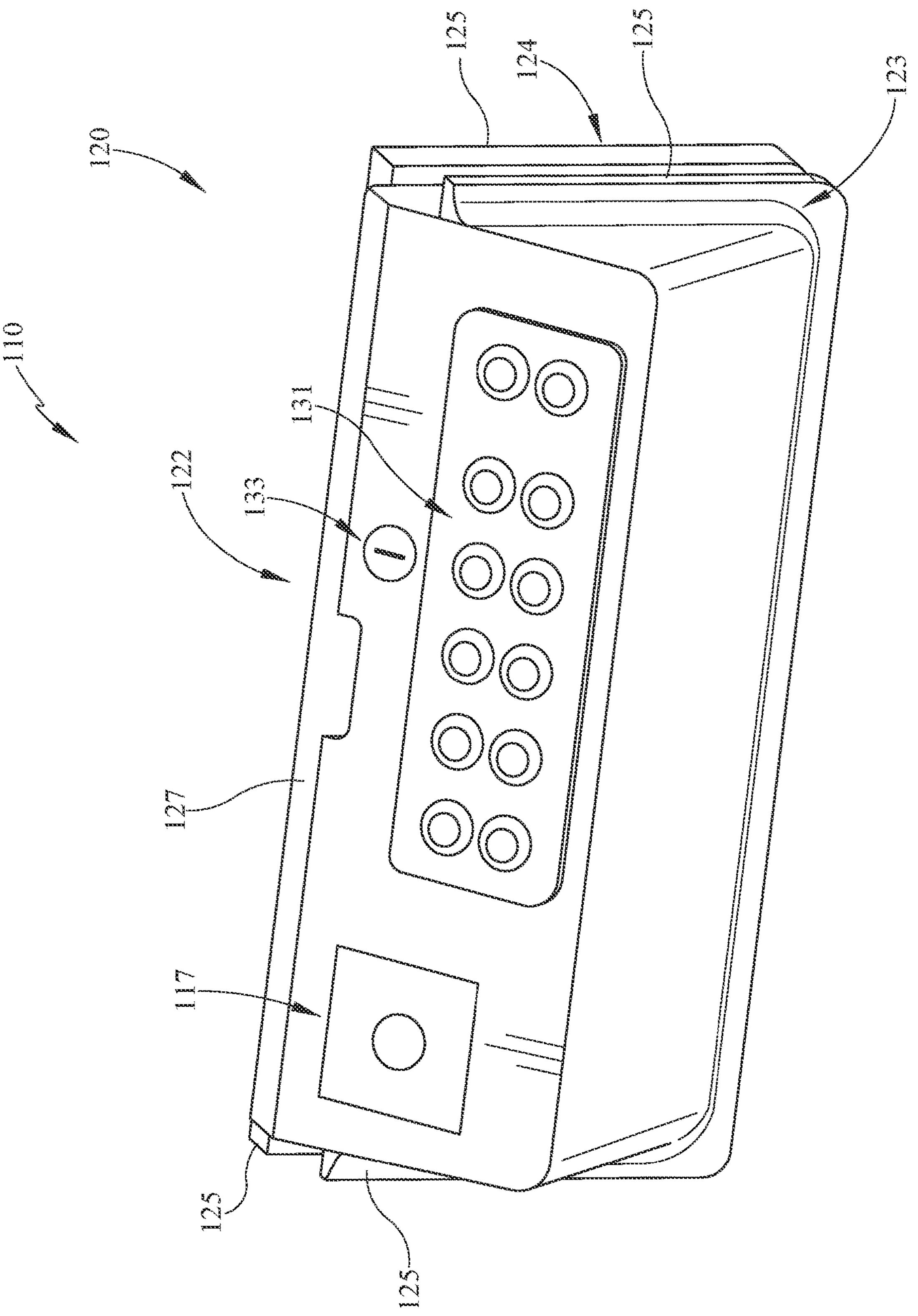
FIG. 7 is a perspective view of an example locking module.

With reference to FIG. 7, a perspective view of an example locking module 120 is shown. A housing 122 may be a one or more piece housing but should be strong enough to re-buff attempted breakage to access the container 110. In some examples the housing is a two-piece structure. The housing 122 may include an outer wall 123 which is outwardly facing, and inner wall 124 which is inwardly facing. The outer wall may 123 may be formed to be flush with the outer shell 127 and the inner wall 124 may be flush with the inner shell 128, or alternatively may be formed to not engage the inner shell, so not to create a potential leak location by opening the inner shell 128. The housing 122 may include one or more ribs 125 along a perimeter in order to provide sealing engagement with the outer shell, the inner shell, or both. The engagement may be direct or indirect, for example via the module frame 132 (FIG. 6). The lock housing 122 may be attached to the base or frame 132 by fastener, or may be attached by adhesive structure, or a combination, or other means. The module frame 132 for example, may provide a sealing structure that is located between the sealing ribs 125, or in combination with an additional sealing material.

The upper surface of the housing 122 may comprise a flat surface 127. The flat upper surface 127 may be at an elevation that corresponds to the inner surface elevation of the lid 114, a seal on the lid, or any sealing surface or structure associated with the lid 114 so that the lid 114 or such seal has a surface for engagement. Additionally, therefore, the upper flat surface 127 of the lock housing 122 may be flush with upper surface of the base 112 so that the upper surface or edge 127 has a continuous appearance and ability to seal, if necessary.

Additionally, the lock module 120 comprises a keypad having a plurality of buttons 131. As noted is it may be, in some aspects, desirable to have actuation to lock the container. The keypad comprises the buttons 131. The buttons 131 may be alpha-numeric and may include buttons which either or both of lock or unlock, as designated by icons, for example. Additionally, a mechanical keylock 133 may be disposed on the lock module 120 to actuate the lock assembly manually from the exterior of the container. The keylock 133 may provide functionality even in the event batteries or other power source are not available.

The lock module 120 may also comprise smart features, such as internet connectivity, camera for facial recognition, or to record those who access the container for security purpose, or motion sensor for further security and to activate one or more other features, such as camera operation. The smart features may also include technology that can access weather databases for the location of the container and advise consumer on whether ice is needed, or how much ice is needed. The smart features may additionally provide the consumer advise on cooler performance, optimizing such performance, advertisements, additional accessories available, or useful information during camping, for non-limiting example. This information may be stored locally or may be accessed by internet connectivity. Additionally, the smart feature may include connectivity either short range or via wi-fi connection to the internet to either cloud control or local access via an app or website on a smart device such as pad or phone.

Figure 8:
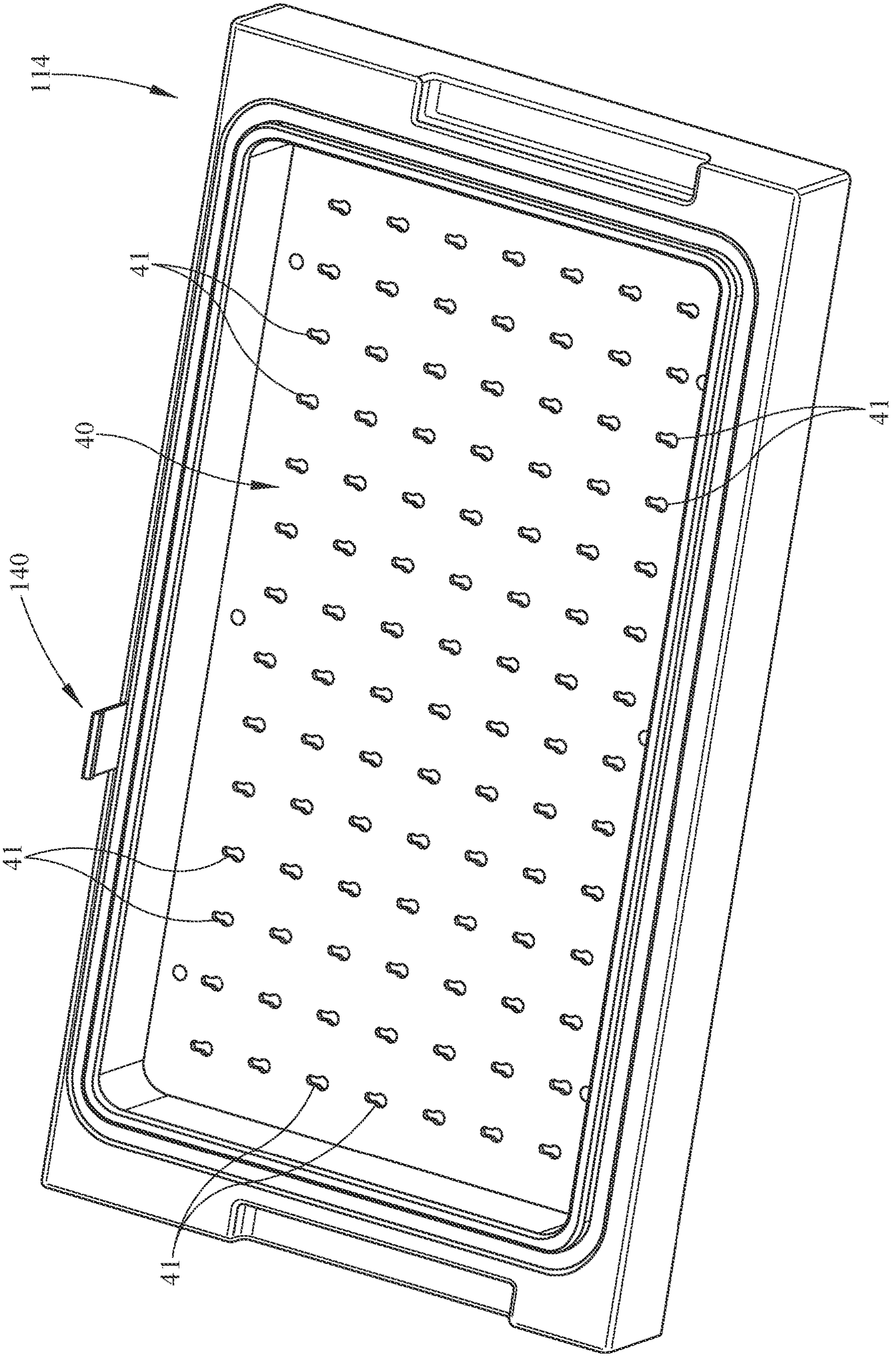
FIG. 8 is a perspective view of the undersurface of the lid depicting an integrated latch.
Figure 9:
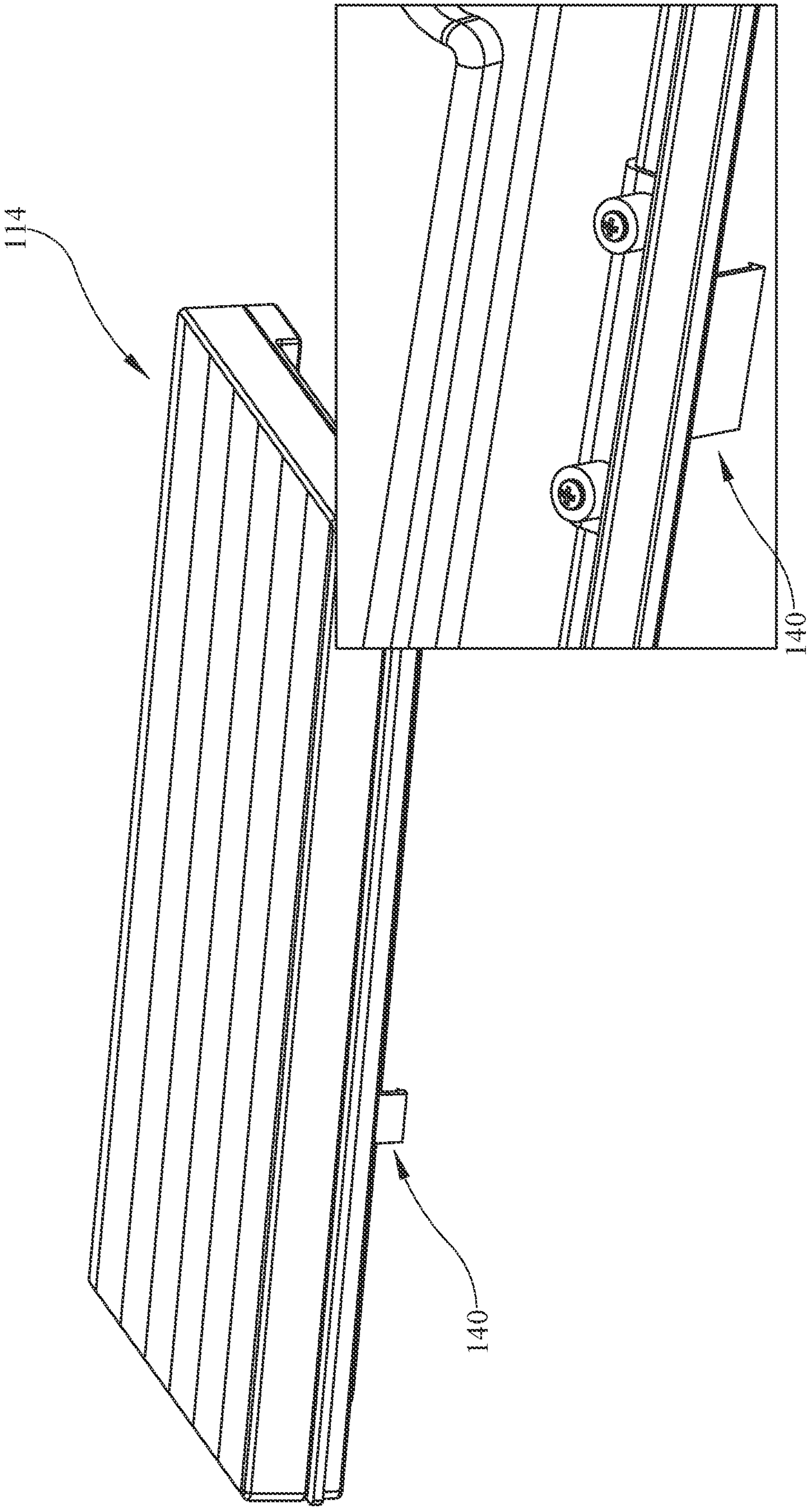
FIG. 9 is a perspective view of an alternate lid depicting an alternate latch of the lid.

Referring now to FIGS. 8 and 9, two versions of a latches 140 are depicted. The latch 140 may be disposed in different positions depending on positioning of the lock housing 122. In some embodiments, the latch 140 may be offset from the middle of the lid 114 and near the front edge, opposite the hinge(s) of the container 110. In some embodiments, the latch 140 may be located centrally along the lid 114 front edge. The latch 140 may be located any place on the container 110 such that there is a mechanical engagement with the locking module 120, either directly or indirectly.

Additionally, the latch 140 may be formed in various manners. For example, the latch 140 may be formed integrally with the lid 114 such as during a molding process of the lid 114. Alternately, the latch 140 may be fastened to the lid 114 as shown in FIG. 9. In some further embodiments, for example if a rigid seal is used in the lid, the latch 140 may be formed with the seal and depend downwardly to engage the lock housing.

In any of these embodiments, the latch 140 may be formed to engage the locking module 120 in various ways. For example, the latch 140 may be self-clamping upon closure of the lid 114. In other embodiments, the lid 114 may be closed and the locking assembly 134 may move in order to grasp and retain the latch 140 and lid in the closed and locked position.

Additionally, as shown in FIG. 8, an accessory grid 40 may be disposed for securing various accessories. Example accessories include, but are not limited to, a secure box for prescription medications, small to medium size storage bags, reusable ice blocks, a flashlight style light for nighttime deliveries or retrieval of packages, an envelope pouch/sorter, a UV sanitizing wand, and a semi-flexible pouch for packages, envelopes or small bags. The accessories can be sized and shaped to be placed within at least one storage compartment of the container.

The accessory grid 40 can include accessory mount holes 41 extending through a first surface and a second surface of the accessory grid apparatus. The accessory mount holes 41 can define a grid for removably attaching accessories at positions according to the grid. The accessory mount holes 41 can be adapted to receive at least one mount element (e.g., mount tab) of an accessory.

Figure 10:
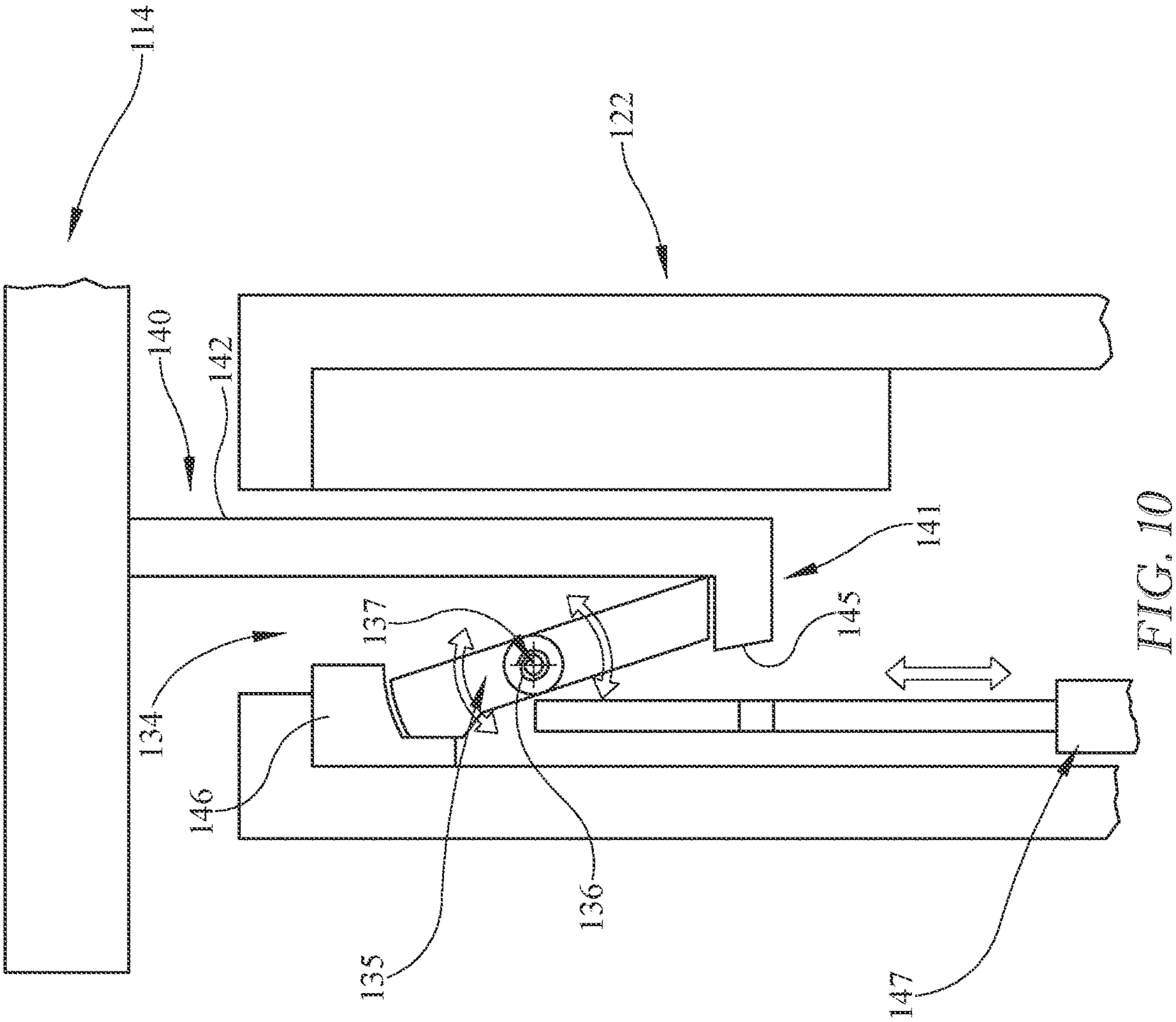
FIG. 10 is a schematic view of a lock assembly of said lock module which engages a latch of the lid.

Referring now to FIG. 10, an example embodiment of a locking assembly 134, within the locking module 120 is depicted in schematic side section view. The lock assembly 134 provides that the lid 114 may be closed and the mechanical engagement of the lock assembly 134 occurs without any necessary motor operation. The inner and outer walls 123, 124 of the lock housing 122 are depicted with an example lock assembly 134 therein and engaged by the latch. The lock assembly 134 includes a lock pawl 135 that is biased in one direction and in the instant embodiment is shown biased toward the locked position. The bias may be provided by structures of various forms, and in some embodiments may be provided by a torsion spring 136, for example. The torsion spring 136 may have an axis disposed on a pivot axis 137 of the lock pawl 135 so that the lock pawl 135 is biased toward a locked position as shown. The lower end of the lock pawl 135 engages the latch and may have a chamfer or taper to enhance engagement with the latch 140. As shown in the example, the latch 140 may include a leg 142 and a foot 141 wherein the lock pawl 135 engages the foot 141 or the intersection of the leg and the foot. The end of the foot 141 may also have a taper, chamfer, radiused, or angular shape 145 in order to improve the passage by the lock pawl 135.

On the opposite side of the pivot axis 137 of the lock pawl 135, may be a seat 146 for the upper end of the pawl 135 to engage the foot 141. The seat 146 may be hardened or have other strengthening characteristic to improve the locking engagement and preclude bending or breaking force on the lock assembly 134.

Adjacent to the lock pawl 135 is an actuator 147 which may be movable to engage and disengage the lock pawl 135. The instant actuator 147 provides a linear movement which is generally vertical to disengage the pawl. The actuator 147 may be defined by various mechanical structures which are powered, including but not limited to, a solenoid or a cam which may directly, or indirectly such as by the depicted arm, engage the lock pawl 135. By engaging the lock pawl 135, the force may act against the lock pawl 135 to pivot opposite the biasing force, of for example the torsion spring 136. Once pivoted clear of the latch 140, the latch 140 and lid 114 may be raised to open the container. In this construction, the lid 114 may be closed and the latch 140 passes the pawl 135. Once the foot 141 of the latch 140 passes, the lock pawl 135 pivots into locking engagement depicted until the actuator disengages the lock pawl 135 and latch 140, for opening of the lid 114.

Figure 11:
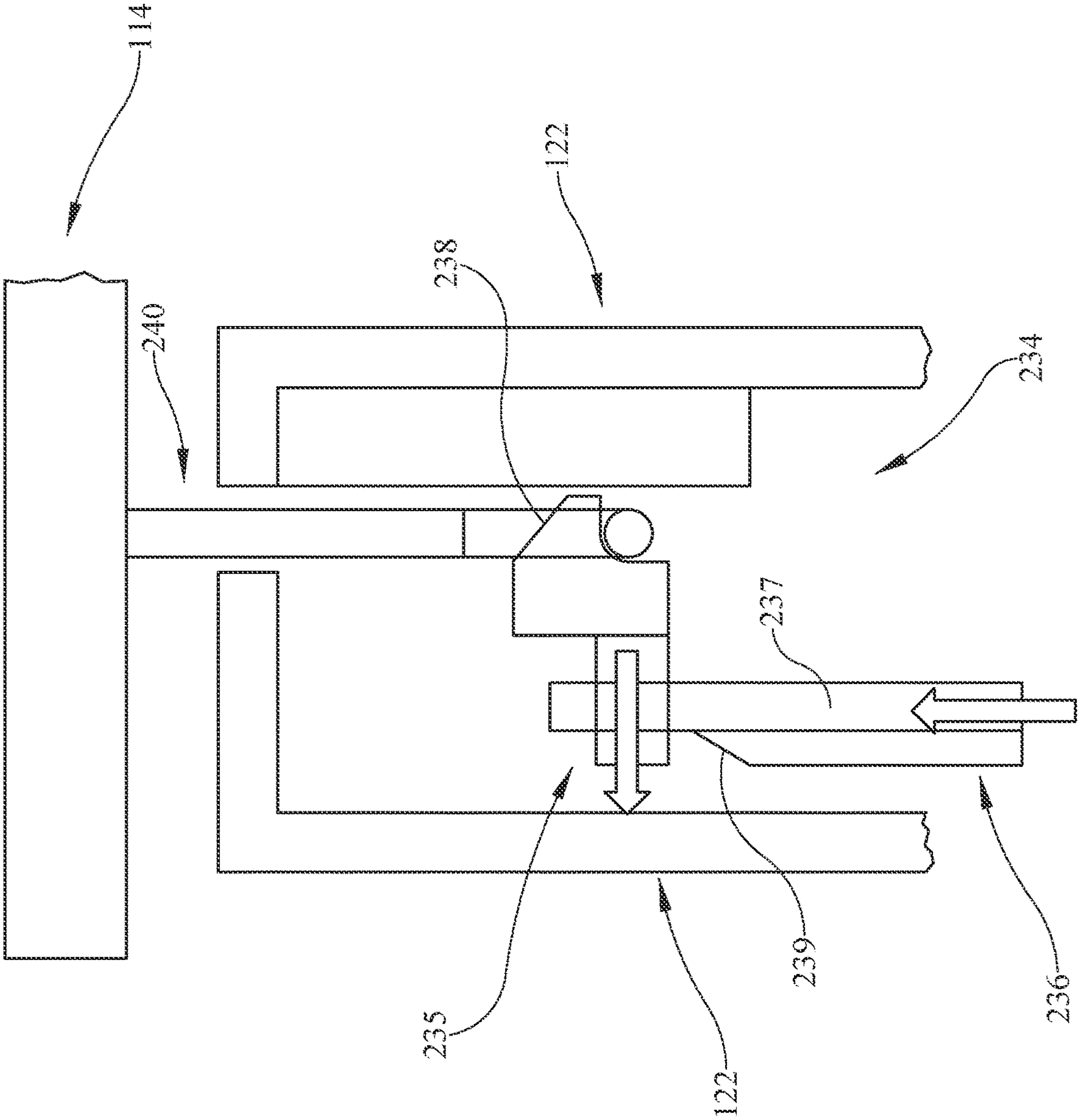
FIG. 11 is a schematic view of a second lock assembly of said lock module which engages a latch of the lid.

Referring now to FIG. 11, a further alternative embodiment of a lock assembly 234 is depicted. As with FIG. 10, the example embodiment of FIG. 11 provides a lid 114, latch 240 and lock assembly 234 which allows for closing of the lid to be automatically, without motor assistance. In the depicted embodiment, the latch 240 is shown in the closed and locked position, engaged by a spring loaded pawl or catch 235. The pawl or catch 235 is biased toward the locked position, as in the previous embodiment, and includes an upper tapered or chamfered surface 238 that causes linear movement of the catch 235 as the latch 240 engages to pass during movement from the open to closed position.

Beneath the catch 235, an actuator 236 is disposed to, directly or indirectly, engage the catch 235. The pawl or catch 235 is biased toward the latch 240 to retain the lid 114 in the closed position. The catch 235 may move upon actuation of the actuator 236 against the biasing force of, for example, a spring. In this embodiment, amongst other differences, the actuator 236 acts linearly but instead of a resultant rotation, there is a resultant horizontal movement. The actuator 236 or an arm 237 extending to engage the catch may and urge the catch away from the latch 240. This movement and subsequent disengagement allows the latch 240 to release from the catch 235 and opening of the lid 114. The actuator or arm 237 may also include an angled surface 239 to actuate linear movement of the catch 235.

Figure 12:
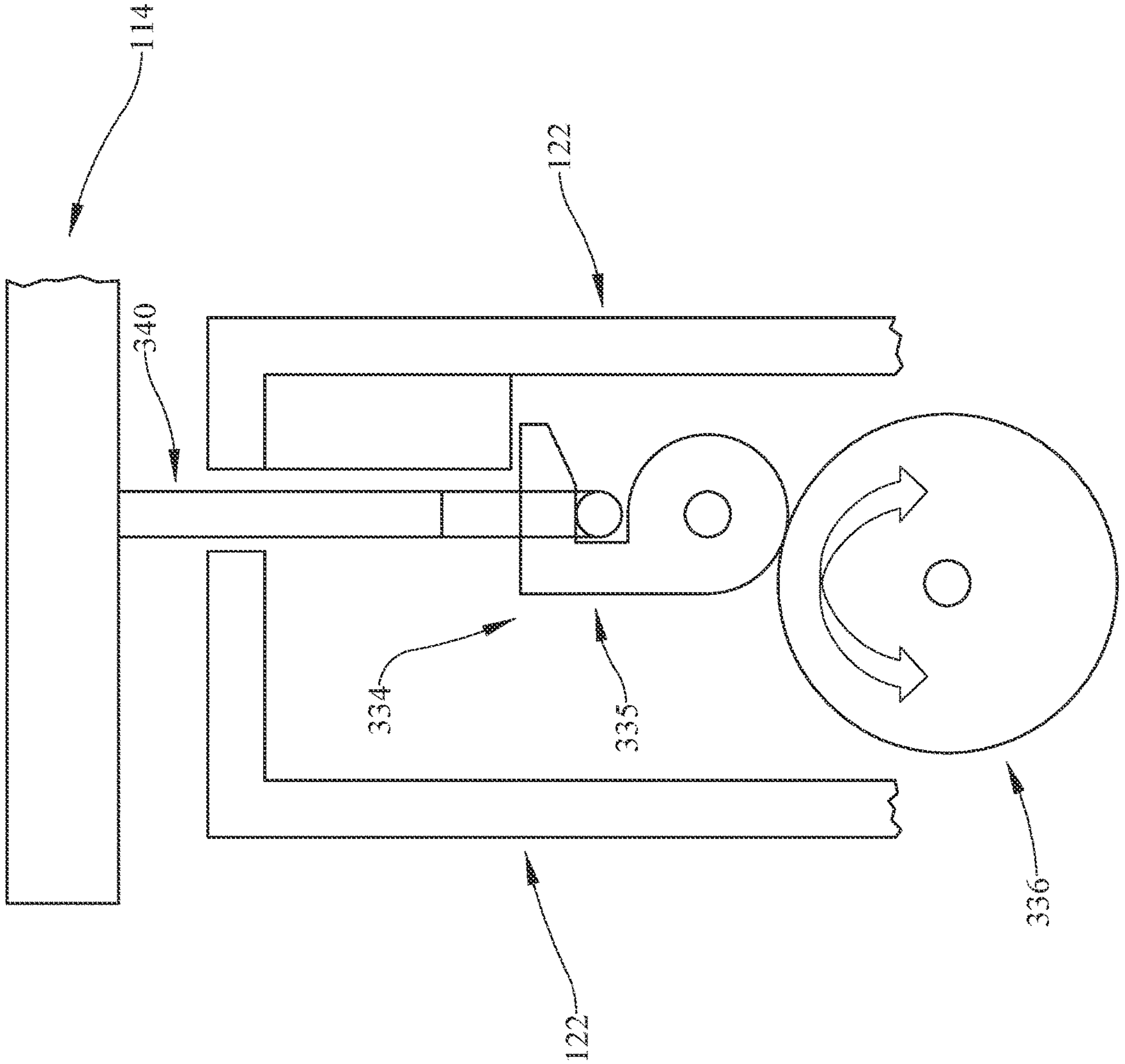
FIG. 12 is a schematic view of a third lock assembly of the lock module which engages the latch of the lid.

Referring now to FIG. 12, a further embodiment of an alternate locking assembly 334 is depicted. This embodiment differs from the previous locking assemblies 134, 234 in that a motor causes engagement of a catch 335 with a latch 340. Alternately stated, the latch 340 moves into the closed position and an actuator 336, for example a motor, causes engagement with the latch 340 to retain the latch 340 and lid 114 in the closed position. In the instant schematic figure, a motor is shown defining the actuator 336, which rotates and drives rotation of the catch 335. The catch 335 is shown in the engaged position with the latch 340. The motor 336 turns in one direction to drive rotation of the catch 335 to engage the latch 340. Alternately, the motor 336 may rotate in a second direction to drive the catch 335 to disengage from the latch 340, and allow opening and closing of the lid 114. Thus, this example provides a rotational motor 336 movement and a rotational catch 335 movement.

Figure 13:
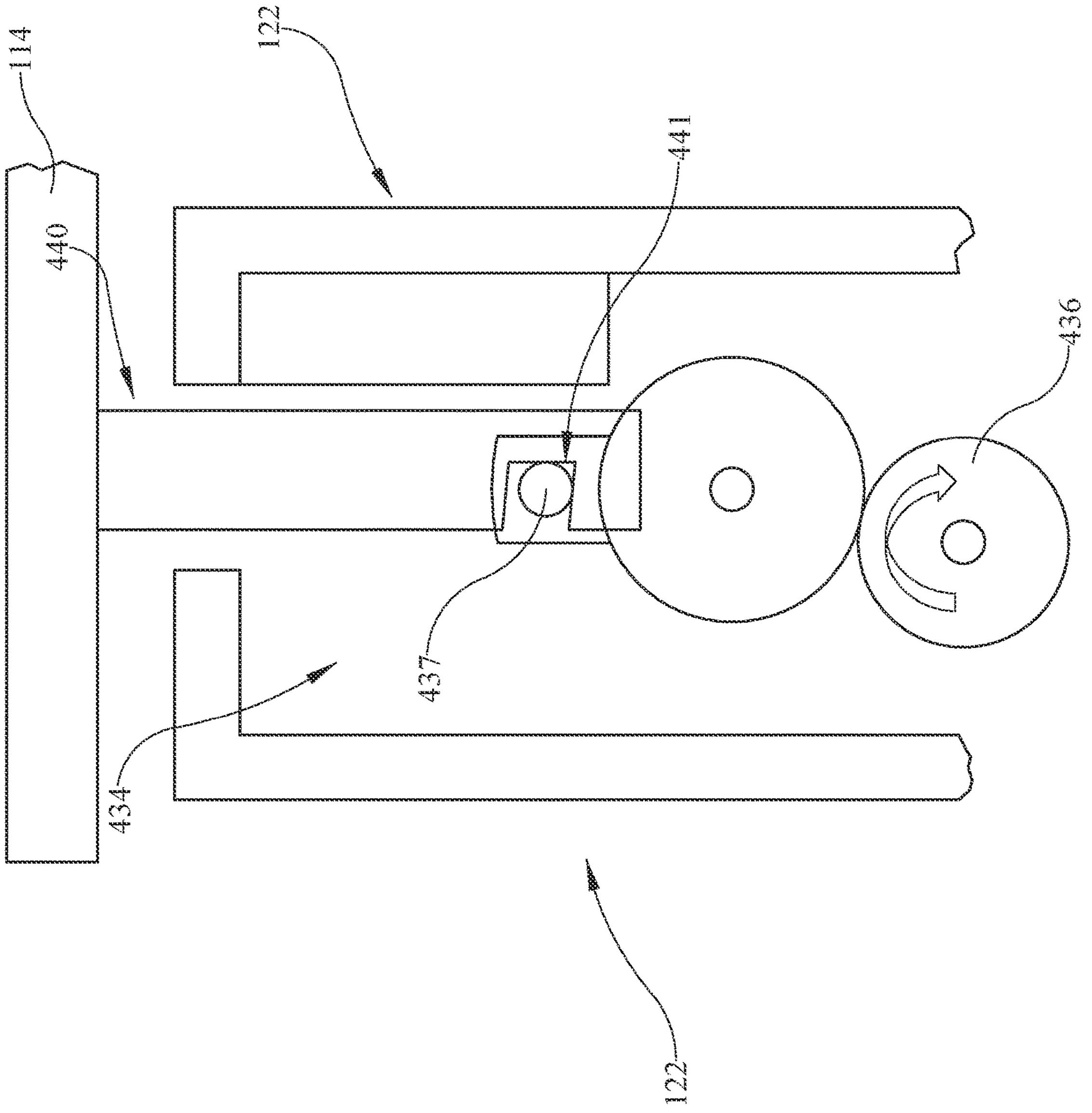
FIG. 13 is a schematic view of a fourth lock assembly of the lock module which engages the latch of the lid.

Referring now to FIG. 13, another alternative lock assembly 434 is shown. The embodiment again uses a motor actuator 436 to engage the latch 440 and pull the lid 114 tight. However, in this embodiment, rather than a catch that moves with the actuator 436 movement, a pin 437 is driven by the actuator 436 movement, and engages a cutout portion 441 in the latch 440. Once located in the cutout portion 441, further actuation tightens the closing of the lid 114.

Figure 14:
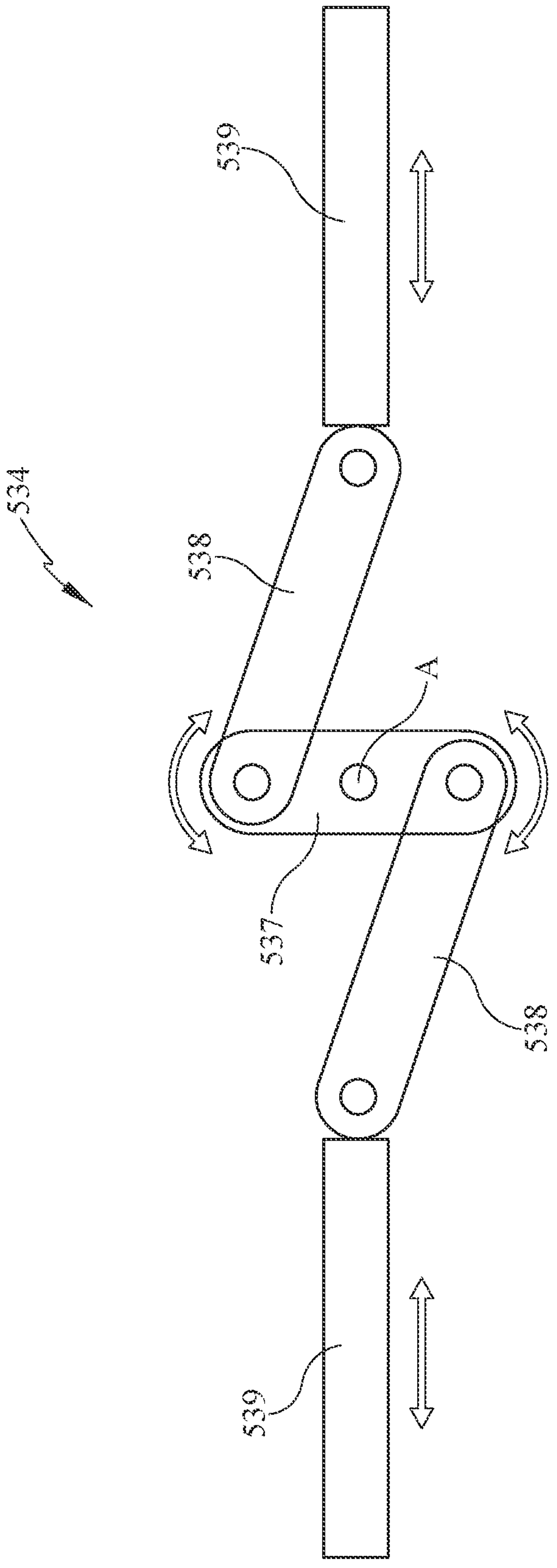
FIG. 14 is a schematic view of a fifth lock assembly of the lock module which may be utilized with the lid or the base.

Referring now to FIG. 14, a further lock assembly 534 is depicted wherein an actuator may cause movement of locking arms. More specifically, in this embodiment, the actuator A may be a motor or may be a torsion biasing spring on a shaft. The actuator may further comprise an arm 537 which moves with the actuation. The arm 537 rotates about a pivot point, indicated generally at A, and is connected to linkages 538 which may move locking bars 539.

The locking bars 539 receive the rotary movement of actuator A via the linkages 538 and which is converted to linear movement of the locking bars 539. The lock assembly 534 may be disposed in the base of the container or may be disposed in the lid. In either embodiment, the locking bars 539 may be moved to engage with features in the opposite lid/base structure and effectuate locking.

Figure 15:
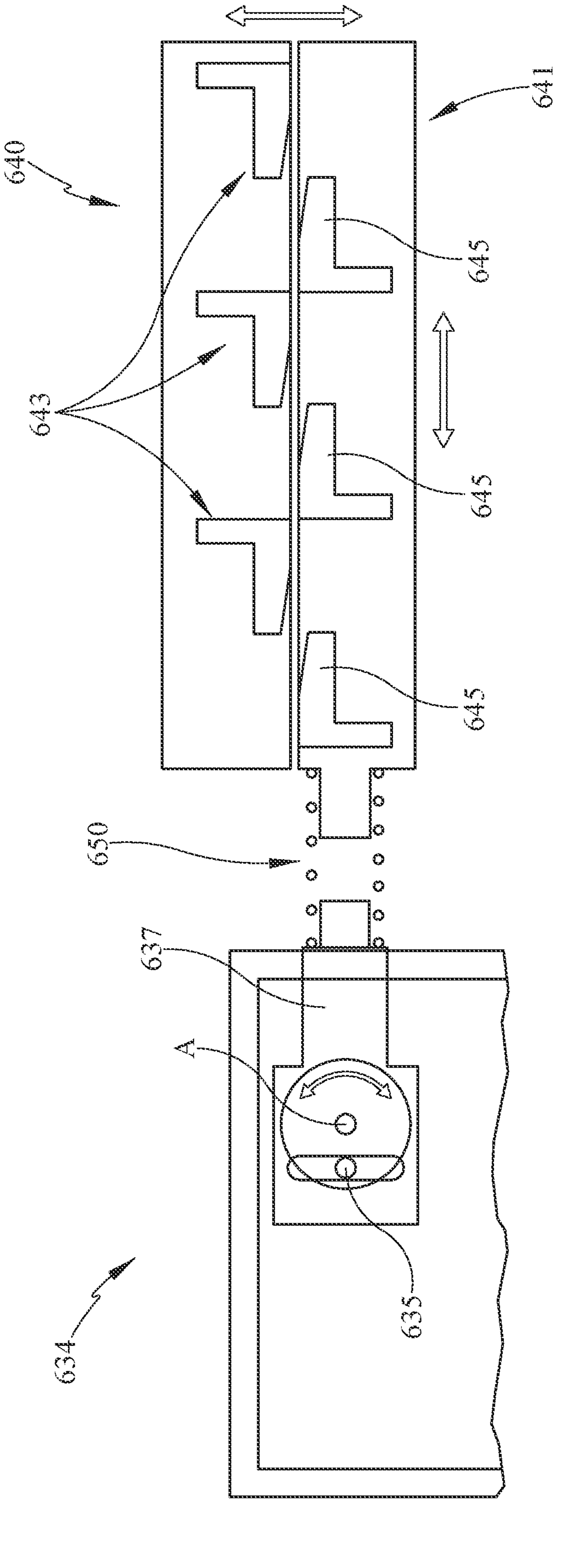
FIG. 15 is a schematic view of a sixth lock assembly of the lock module which may be utilized with the lock module.

Referring now to FIG. 15, a schematic view of a further embodiment of a locking assembly 634 is depicted which is disposed in the lock module and provides lid engagement. The lid comprises a latch 640 is shown with teeth 643 which are spaced apart and generally L-shaped. The teeth 643 spacing allows for passage of corresponding base teeth 645 disposed on a catch 641 of the lock assembly 634 between.

The locking assembly 634 is provided with an actuator A which moves a pin 635. An arm 637 moves like a follower where the pin 635 functions as a cam. When the arm 637 moves, a plurality of base teeth 645 are moved linearly. The teeth 645 are spaced apart in a corresponding distance relative to the teeth 643. In the position depicted, the teeth 643 can pass by the base teeth 645. Once the teeth 643 pass the base teeth 645, the actuator A can be actuated to move so that the teeth 645 engage the teeth 643 and the latch 640 is blocked from opening.

In some embodiments, it may be desirable have an autolocking function wherein the lock assembly 634 moves automatically to the locked position. In other embodiments, it may be desirable that the lock assembly only lock when actuated by the actuator A. The instant embodiment utilizes a spring 650 which provides a biasing force to the on the teeth 645. In this embodiment, the lock assembly 634 is biases to auto-lock when closed. Alternately, the spring 650 may be replaced by a fixed spacer. With a fixed spacer, the base teeth 645 can only move by the actuator A.

Figure 16:
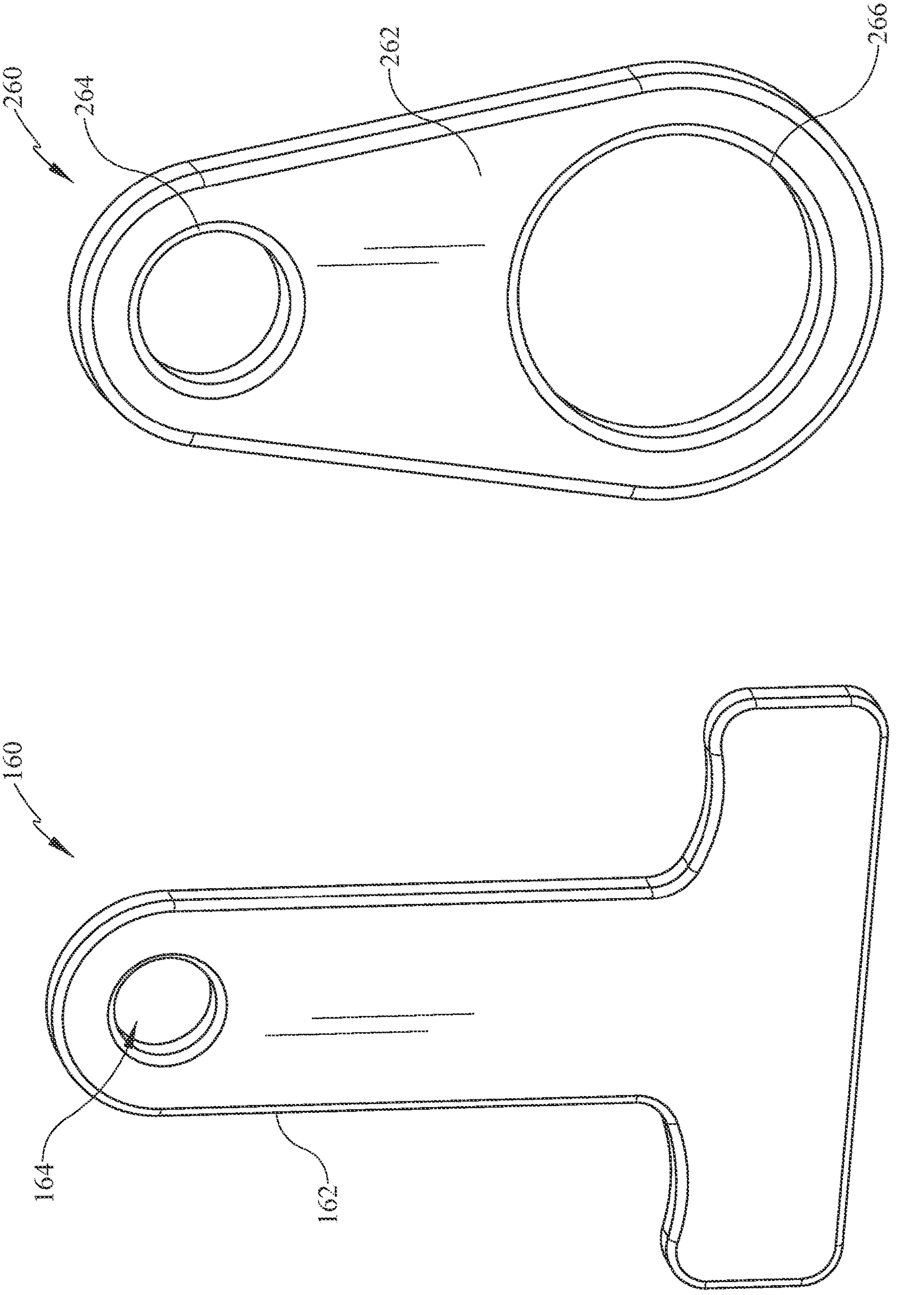
FIG. 16 depicts two versions of safety releases which may be grasped and pulled to overcome the lock assembly.

Referring now to FIG. 16, a further concept is depicted where in the container 10, 110, and more specifically the lock module 120, may comprise a safety release 160 which allows manual disengagement of the locking assembly 134. For example, if a child accidentally enters the container and the lid closes, the child has means to overcome the lock function from inside the container 10, 110 and escape from the container. FIG. 16 depicts two release grabs which may be used. One example provides a T-shaped structure 162 which further comprises an aperture 164 for connection to a cord or cable (not shown). The cord or cable may be connected to the locking assembly 134 in order to overcome a locking function to release the latch and allow opening of the lid 114. In the second example of FIG. 16, the release grab 262 has an oblong shape with two holes 264, 266. One hole 264 is for connection to a cord, as previously described. The second large hole 266 is a finger grab, wherein one or more fingers may be inserted to hold the release grab and pull. In either embodiment, the safety releases 160, 260 may include structure for attachment of a cord or cable and a second structure to aid in grasping while pulling the safety release.

In some embodiments, the cord may be a rigid structure so that alternatively a pushing force may also be applied to overcome the locking assembly. The release grab may be formed of various materials and is generally rigid enough that force may be applied to the release grab to actuate the locking assembly without causing deformation of the release grab. Additionally, the release grab may be formed of a material that glows or has other illumination characteristic, so that if trapped inside, the release grab is visible in the dark and if illustrations or instructions are provided, such text may also be in an illuminated ink, screen print, or the like so that a user can understand how to operate.

Figure 18:
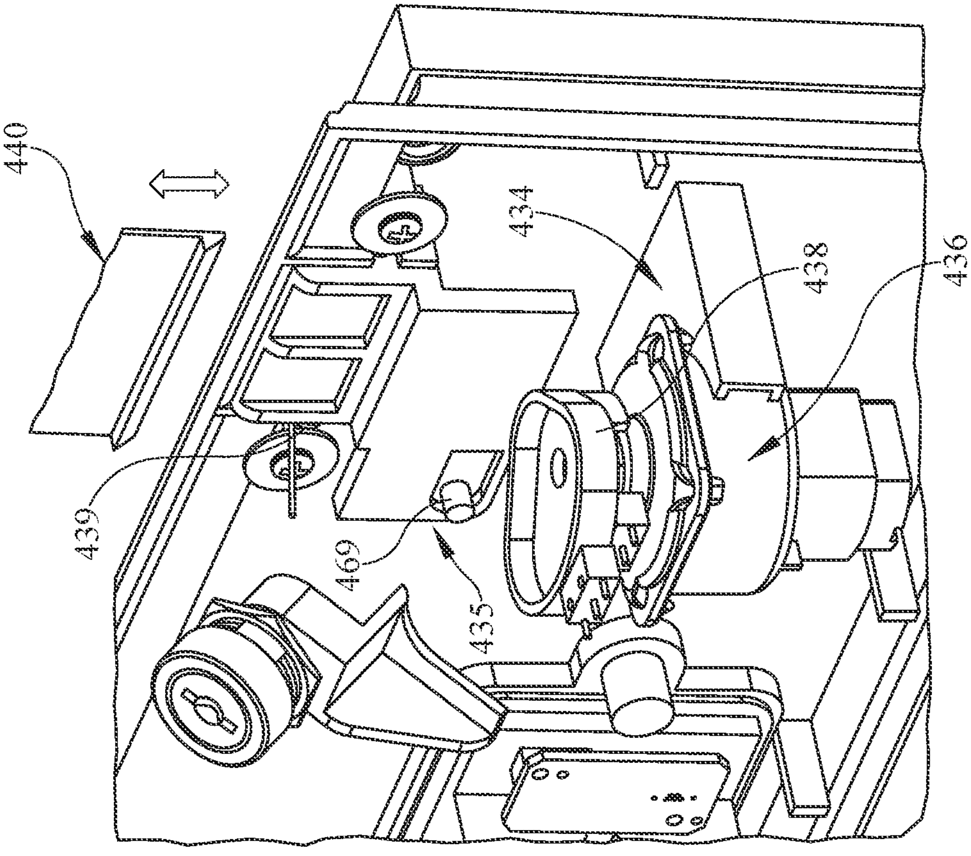
FIG. 18 is a perspective view of a lock assembly in a locked position with the latch moving toward engagement.

With additional reference to FIG. 18, a safety pull 469 is shown engaging or adjacent to the catch 435. The safety releases 160, 260 may be positioned on the right side of these figures, on the inside of the container, and connected by cord, cable, or other structure to the safety pull 469. When the safety releases 160, 260 are pulled, to the right in the depicted example, the catch 435 may pivot to disengage the latch 440. The function of the safety releases and the safety pull 469 is to override the powered latch system so that if a person or child is trapped inside the container, the lock assembly may be overcome to allow escape.

Figure 17:
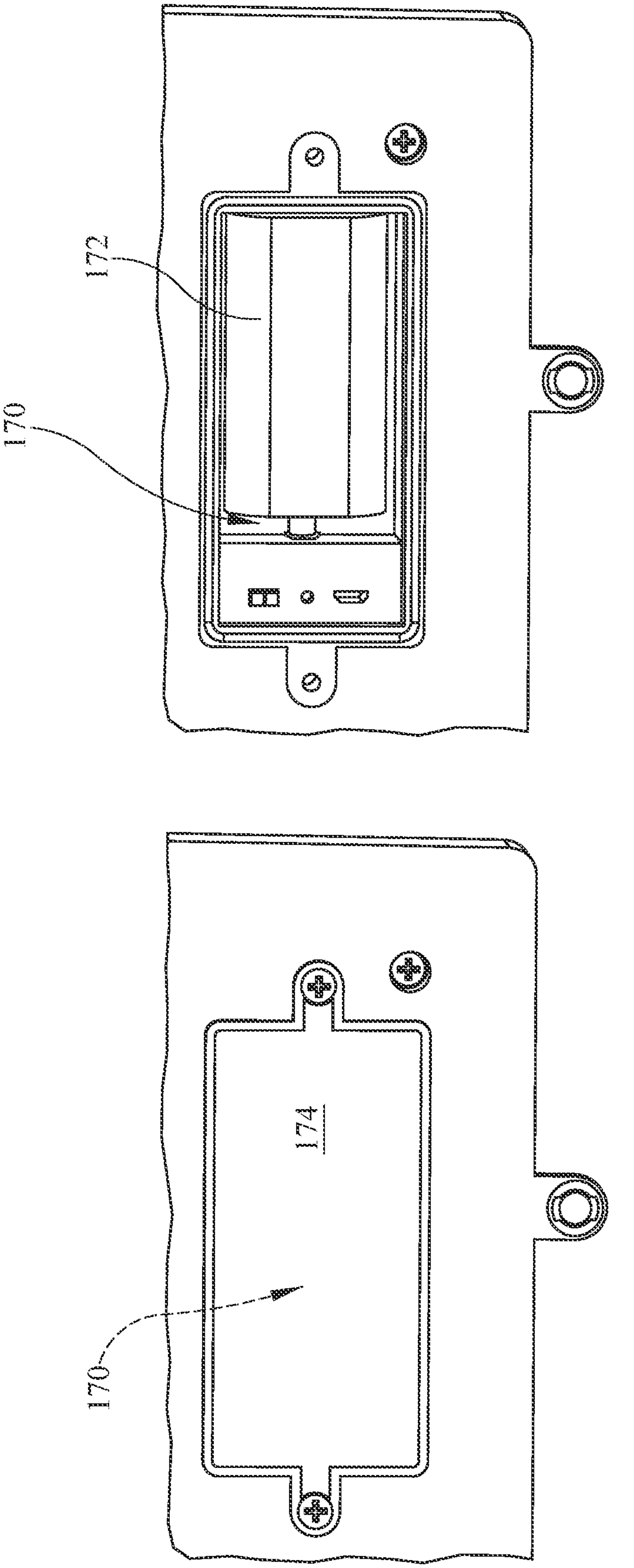
FIG. 17 is a rear elevation view of a rear surface of the lock module comprising a door and compartment wherein a battery or battery pack may be stored.

Referring now to FIG. 17, rear views of an example lock housing 122 is depicted in covered and uncovered conditions. As mentioned previously, the lock assembly 134 may be powered for either engagement, disengagement, or both. In the instant embodiment, the lock housing 122 may have a battery compartment 170 on the rear surface. As depicted on the left, the battery compartment 170 may be fastened closed and may retain one or more batteries therein. The batteries may be placed directly into the compartment 170, or alternately may be placed into a tray or other containment structure to define a battery pack 172, shown on the right, which is inserted into the battery compartment 170. A door 174 is shown with a which covers the compartment 170 and closes the compartment for operation.

In other embodiments, a battery compartment may be located along the top edge of the lock housing. The may allow for an ease of drop in battery changing. However, may also require that the battery pack or resultant shape of the lock housing allows for sealing of the lid. Regardless of the embodiment, it should also be understood that the container may also have wired power source so that the container has power source which is AC or DC functionality, or both.

Referring now to FIGS. 18-21, further embodiments of the locking assembly 434 are depicted. This view is looking from the interior of the lock housing 122 toward the rear of the housing or inside of the container. In these Figures, interior views of example locking assemblies 434 are provided. With the instant locking assembly, an actuator 436, for example motor, is shown at the bottom of the assembly which rotates a cam 438. The cam 438 may vary in shape depending on the movement needed at a catch 435 disposed in the lock housing. The catch 435 is connected to a pivot axis defined by an axis. Positioned on the axis is a catch actuator 439, for example a torsion spring, which biases the catch 435 to a locked position, and which allows for movement of the catch 435 to an unlocked position. The catch actuator 439 biases the catch 435 against and maintains engagement with, the cam 438. Thus where the cam 438 shape or profile changes so that the contact point between the cam 438 and catch 435 moves further from the centerline of actuator 436, catch 435 rotates and releases the latch 440.

Rotation of the cam 438 may be some preselected angular distance, for non-limiting example, 180 degrees. As depicted in FIG. 18, the cam is engaging the catch 435, which functions as a follower relative to the cam movement. The cam 438 is shaped so that when rotated some preselect angular distance, the catch 435 or some portion thereof is caused to pivotally move further from a centerline axis of the actuator 436, for example the motor. With additional reference to FIG. 19, the movement is depicted and a portion of the catch 435 which engages the latch 440 moves away, for example by tilting, from the latch 440. At this condition, the latch 440 and lid 114 may be raised as the container is in the unlocked position.

Figure 20:
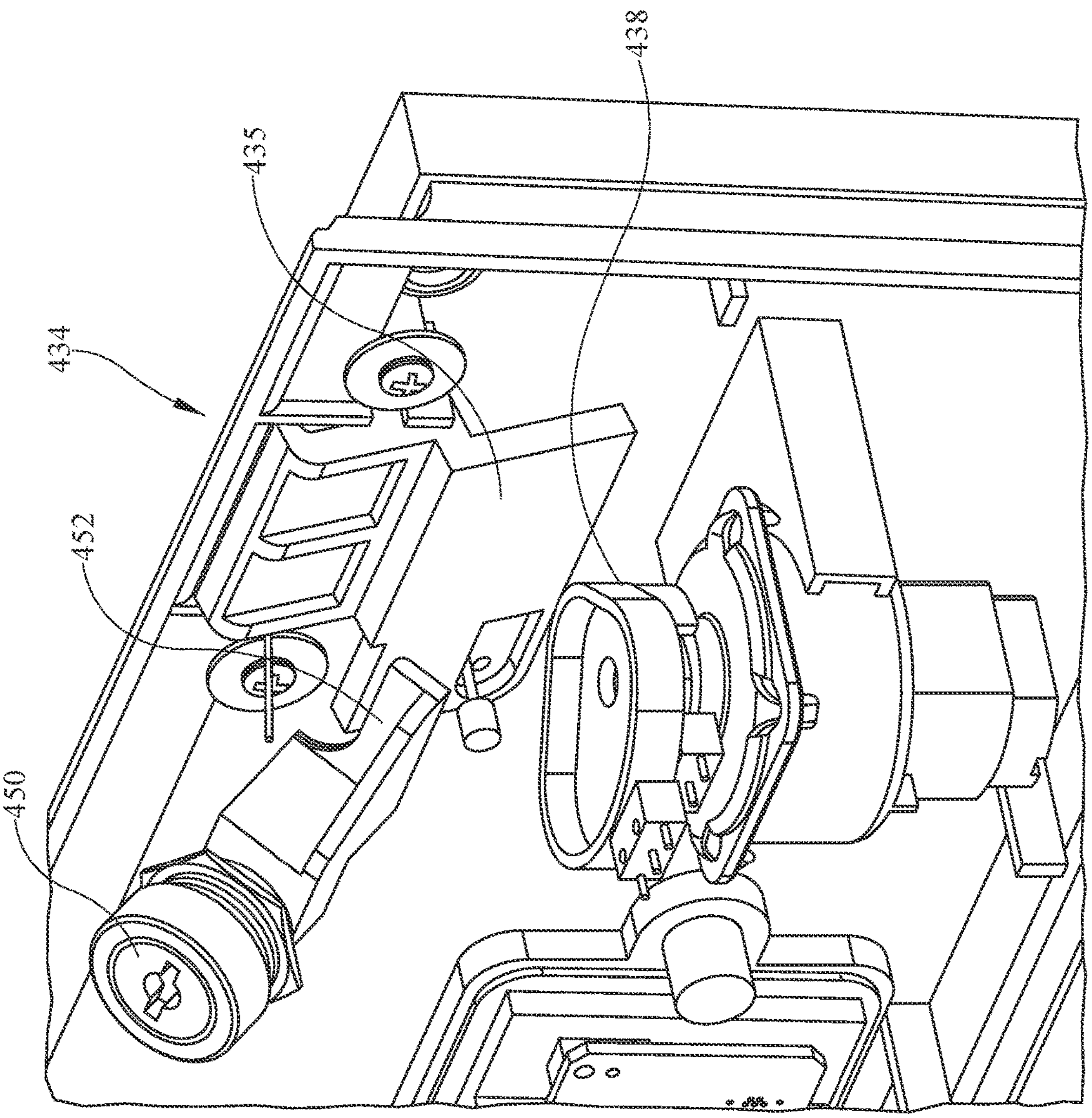
FIG. 20 is a perspective view of the lock assembly of FIGS. 18 and 19, and depicts movement of the keylock for disengagement of the lock assembly; and, FIG. 21 is a perspective view of an alternate lock assembly.

With additional reference to FIG. 20, a perspective view is again shown and reference is made to a keylock 450. The keylock 450 allows for manual actuation of the locking assembly 434 within the lock housing 122. The keylock 450 is shown having a keylock arm 452, which is shown rotated to engage the catch 435. The engagement overcomes the spring force, or actuator, on the catch 435 and causes tilting of the catch 435. This keylock 450 and arm 452 allows any of lock assemblies to be overcome or overridden, in a non-powered manner and releases the latch 440, allowing opening of the lid 114.

Figure 19:
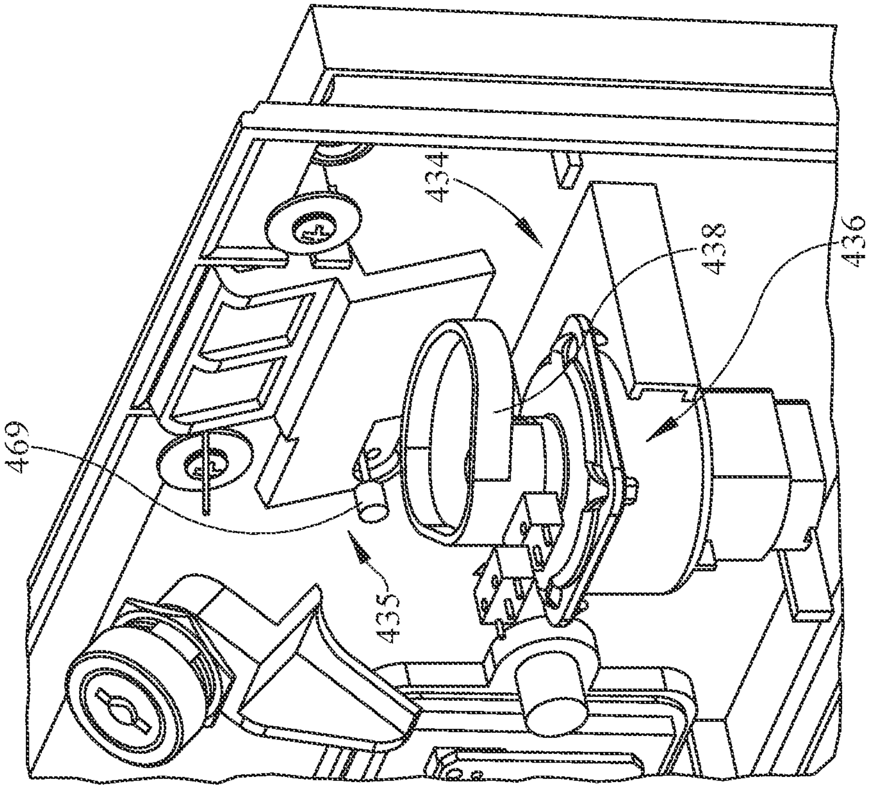
FIG. 19 is a perspective the lock assembly of FIG. 18 in a second position so that the lock assembly is moved to an unlocked position.

Additionally, as will be noted from review of the FIGS. 18-20, as well as other embodiments, the lock assemblies may have auto-lock features or non-auto-locking features. The normal position of the cam 438, for example, may control the position of catch 435 and therefore be determinative of whether the catch 435 lock or does not lock the lid when the lid closes. For example as shown in FIG. 20, the cam 438 is positioned in a manner in which the catch 435 would be normally disposed for locking, absent the actuation of the keylock 450 depicted. Alternately, FIG. 19 shows a cam 438 position in which the lid would not auto lock when closed. This concept is applicable to the plurality of embodiments of the lock assemblies.

Figure 21:
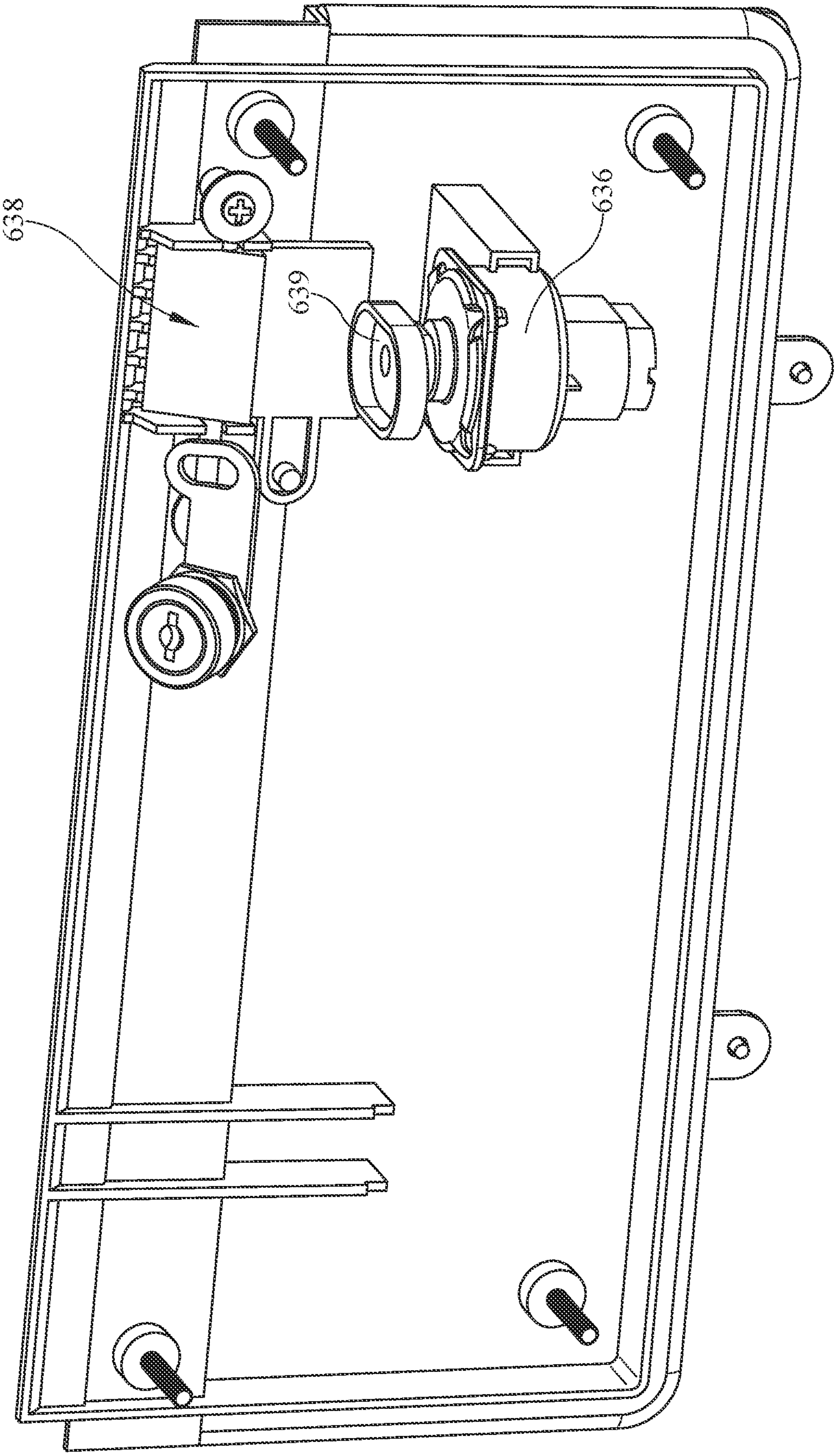

Referring now to FIG. 21, a further embodiment is depicted in a front looking rearwardly perspective view. The function is similar to the embodiment but shows an alternate cam shape. In this embodiment, cam 639 may rotate in 90 degrees increments based on the motor 636 operation in order to move the catch 638 between locked and unlocked positions. In this embodiment, the cam is shown positioned in a locked position. When the cam 639 rotates to create a space between the cam and catch (follower), the catch can tilt allowing unlocking of the device.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A system, comprising:

an insulated container having:

a base and a lid;

said base having an outer shell, an inner shell, and a cavity therebetween having an insulating portion disposed in said cavity, and at least one storage compartment, said lid having a lid outer shell, a lid inner shell and a lid cavity therebetween having a lid insulating portion therebetween, an opening formed in said base, said opening defined in both said inner shell and said outer shell of said base;

a module frame disposed in said opening;

a locking module disposed in said opening, said locking module having a keypad and a lock assembly, said module frame engaging said base and receiving said locking module;

said locking module comprising an actuator which actuates a cam to move a catch, said catch being biased in one direction and moved by said cam in a second direction;

an upper surface of the locking module being aligned with an upper periphery of said base to define a sealing surface for said lid.

2. The system of claim 1, wherein said locking module comprises one or more piece housing.

3. The system of claim 1, wherein said locking module is fastened in said opening formed in said base.

4. The system of claim 1, said lid further comprising a latch which engages said locking module.

5. The system of claim 4, said latch formed integrally with and depending from said lid.

6. The system of claim 4, said latch formed separately of a metal or metal alloy and depending from said lid.

7. The system of claim 4, further wherein said actuator is a motor that moves said catch and disengages said latch.

8. The system of claim 7, said motor being connected to said cam.

9. The system of claim 4 further comprising a spring loaded catch which pivots to allow passage and engages said latch to retain the lid in a closed position.

10. The system of claim 9, further comprising said movable cam to move the spring loaded catch and disengage said latch, for opening of the lid.

11. The system of claim 1, further comprising a torsion spring to bias said catch.

12. The system of claim 1 further comprising a safety release on said locking module.

13. The system of claim 12 said safety release further comprising a handle connected to a cord to pull and release said lock assembly.

14. The system of claim 1, further comprising a battery compartment for powering of said lock assembly.

15. The system of claim 14 further comprising said battery compartment being a drop in compartment or disposed in a rear surface of said locking module.

16. The system of claim 1 further comprising a key lock on said locking module.

17. The system of claim 1 further comprising a camera module disposed on said locking module.

* * * * *